(12) United States Patent
Nonaka

(10) Patent No.: US 7,127,497 B2
(45) Date of Patent: Oct. 24, 2006

(54) INFORMATION COMMUNICATION SYSTEM FOR CARRYING OUT COMMUNICATION AND DELIVERY OF INFORMATION

(75) Inventor: Eiichi Nonaka, Chiba (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 10/181,304

(22) PCT Filed: Nov. 16, 2001

(86) PCT No.: PCT/JP01/10059

§ 371 (c)(1),
(2), (4) Date: Jul. 15, 2002

(87) PCT Pub. No.: WO02/41181

PCT Pub. Date: May 23, 2002

(65) Prior Publication Data

US 2003/0018790 A1    Jan. 23, 2003

(30) Foreign Application Priority Data

Nov. 17, 2000 (JP) ............................. 2000-351877
Oct. 22, 2001 (JP) ............................. 2001-323197

(51) Int. Cl.
*G06F 15/16* (2006.01)
(52) U.S. Cl. .................... 709/217; 709/203; 382/182
(58) Field of Classification Search ................ 709/203, 709/217, 224, 219; 705/14, 26; 382/182
See application file for complete search history.

(56) References Cited

U.S. PATENT DOCUMENTS 5,937,392 A * 8/1999 Alberts ........................ 705/14

| | | | |
|---|---|---|---|
| 6,313,835 B1* | 11/2001 | Gever et al. ................ 715/846 |
| 6,317,789 B1* | 11/2001 | Rakavy et al. .............. 709/224 |
| 6,476,830 B1* | 11/2002 | Farmer et al. ............... 705/26 |
| 2002/0029252 A1* | 3/2002 | Segan et al. ................ 709/217 |
| 2002/0046102 A1* | 4/2002 | Dohring et al. .............. 705/14 |

FOREIGN PATENT DOCUMENTS

| JP | 11-96099 | 4/1999 |
| JP | 11-126163 | 5/1999 |
| JP | 11-272685 | 10/1999 |
| JP | 2000-207334 | 7/2000 |
| JP | 2000-266551 | 9/2000 |

* cited by examiner

Primary Examiner—David Wiley
Assistant Examiner—Phuoc H. Nguyen
(74) Attorney, Agent, or Firm—Finnegan, Henderson, Farabow, Garrett & Dunner, LLP

(57) ABSTRACT

This invention is directed to an information communication system. An agent terminal (2) constituting this system forms character of a predetermined shape to display the character to permit conversation between the character and user to transmit personal information, etc. of user obtained through conversation to an agent access server to display information from the agent access server in a form such that the character introduces that information. The agent access server (3) constituting the information communication system analyses access from the agent terminal (2) to select a dedicated server (5) in accordance with analysis result thereof to send out information from the agent terminal (2) to send out answer information from the dedicated server (5) to the agent terminal (2). The dedicated server (5) specially processes this information to send out answer information.

18 Claims, 18 Drawing Sheets

| ITEM NAME | DATA | |
|---|---|---|
| ID | 12345678 | 511 / 512 |
| KIND OF PET | DOG | 513 |
| PET NAME | POCHI | 514 |
| HOST NAME | EHCHAN | 515 |
| AGE | 25 | 516 |
| POINT | 3500 | 517 |
| USER ADDRESS | ... | 518 |
| INTEREST | ... | 519 |
| OCCUPATIONAL CATEGORY | ... | |

FIG.4A

| KEY WORD | UP-TO-DATENESS | FREQUENCY | RESPONSE RATIO | DEGREE OF INTEREST | RELATED KEY WORD | ... |
|---|---|---|---|---|---|---|
| PERSONAL COMPUTER | 2000/1/30 | 35 | 3/10 | 90/100 | COMPUTER | ... |
| ROCK | 2000/7/1 | 7 | 1/5 | 10/100 | MUSIC | ... |
| : | : | : | : | : | : | ... |

FIG.4B

| ADVERTISEMENT ID | ADVERTISER | KIND OF ADVERTISEMENT | KEY WORD | ENFORCEMENT DATE | END DATE | RESPONSE RATIO | ... |
|---|---|---|---|---|---|---|---|
| 00001 | ○○ Co. | TEXT | PDA | 2000/1/1 | 2000/1/7 | 50/300 | ... |
| 00002 | △△ Co. | MOVING PICTURE | SHAMPOO | 2000/7/1 | 2000/7/31 | 400/500 | ... |
| : | : | : | : | : | : | : | ... |

FIG.4C

- KEY WORD
- MEANING
- CONVERSATION CONTENT
- CONVERSATION BY AGENT TERMINALS
- AGE LIMIT
- etc.

FIG.4D

ACCESS FROM AGENT TO AGENT ACCESS SERVER

| AGENT ID | OBJECT INSTRUCTION | 1-ST PARAMETER | 2-ND PARAMETER | ... |
|---|---|---|---|---|
| 12345678 | INITIALIZE | DOG | POCHI | ... |

FIG.11A

ACCESS FROM AGENT ACCESS SERVER TO AGENT
(TRANSMISSION IN COMPRESSED MANNER)

| AGENT ID | OBJECT INSTRUCTION | 1-ST PARAMETER | 2-ND PARAMETER | ... |
|---|---|---|---|---|
| 98765432 | INITIALIZE | DOG | POCHI | ... |

FIG.11B

ACCESS FROM AGENT ACCESS SERVER TO AGENT
(TRANSMISSION IN COMPRESSED MANNER)

| AGENT ID | OBJECT INSTRUCTION | 1-ST PARAMETER | 2-ND PARAMETER | ... |
|---|---|---|---|---|
| 98765432 | ADVERTISEMENT DELIVERY | TEXT | ADVERTISEMENT OF ○○ | ... |

FIG.11C

| ITEM | WEIGHT (1~10) |
|---|---|
| JOYFUL | 7 |
| ANGER | 2 |
| SAD | 4 |
| DEGREE OF UPBRINGING | 3 |
| : | : |

INFORMATION COMMUNICATION SYSTEM FOR CARRYING OUT COMMUNICATION AND DELIVERY OF INFORMATION

TECHNICAL FIELD

This invention relates to an information communication system capable of delivering various information and receiving those information and an information delivery system capable of delivering various information, an agent terminal capable of receiving information from an information delivery system and a memory medium adapted so that agent program or agent access program is stored, a memory medium adapted so that dedicated processing program is stored, and an agent program, an agent access program and a dedicated processing program.

BACKGROUND ART

Advertising system utilizing internet serves to insert an advertisement on picture of service that internet service provider provides, or to provide an advertisement by voice. Depending upon its advertising technique, there are mentioned "Banner advertisement", "Affiliate program", "Push-type advertisement" and "Cash back advertisement", etc.

Here, the "Banner advertisement" is the most fundamental advertising technique, and is advertising technique for simply inserting advertisement of Banner type (flag type) on, e.g., home page. The "Affiliate program" is advertising technique to introduce customer so that commission is obtained when sale has been effected. The "Push-type advertisement" is advertising technique for regularly carrying out automatic change of advertisement. The "Cash back advertisement" is advertising technique to answer advertisement or questionnaire so that cash back is provided.

Since conventional these advertising systems utilizing internet have effects of advertisement in their own way while they have both merits and demerits, such advertising systems are employed at present.

In such conventional advertising systems, there were the following problems.

First, in accordance with position of user, there were inconveniences such that user feels very gloomy because advertisement is provided on picture of internet service or by voice, and there a large number of advertisements which are not desired to accept for user among advertisements on picture of internet service or by voice.

In addition, in accordance with position of advertiser or sponsor, there was inconvenience such that degree of satisfaction of user is low so that effective advertisement is not provided.

DISCLOSURE OF THE INVENTION

This invention has been made in view of the above-described circumstances, and its object is to provide a system capable of joyfully acquiring useful information in position of user and capable of carrying out effective advertisement in position of advertiser.

In this invention proposed in order to attain an object as described above, an agent terminal forms character of a predetermined shape to display the character to permit conversation between the character and user to transmit, to an agent access sever, information that user has selected as open information of personal information of user which has been obtained through conversation to display the information from the agent access sever in a form such that the character introduces that information; the agent access server analyses access from user terminal to select a dedicated server in accordance with that analysis result to send out information from the agent terminal to the dedicated server to send out answer information from the dedicated server to the agent terminal; and the dedicated server stores personal information from the agent access server to select information useful for user on the basis of the personal information to send out the selected information to the agent access server. Thus, user can receive service or advertisement corresponding to him even if he makes a search in person to have control right of personal information data base to joyfully acquire profitable information. For advertiser, since advertisement is only offered only to interesting users by information by profile, there is no useful investment and effective advertisement can be carried out so that response ratio of user can be obtained. Accordingly, such system can be utilized for marketing. Since advertisement is carried out on the basis of key word that user feels interest or takes notice, it is possible to prevent resistance with respect to advertisement produced as the result of the fact that incontinent advertisement is carried out. For a manager for information delivery system, direct connection to user can be made. Thus, it is possible to appeal to character of manager. In addition, the merit that very high accuracy profile can be obtained is provided.

Moreover, this invention forms character of a predetermined shape to have ability to display the character, and permits conversation between character and user. This invention can transmit personal information, etc. of user obtained through conversation to a specific server and can display information from the specific server in a form that character introduces that information. Thus, user can receive service or advertisement corresponding to him even if he makes search in person, and can have control right of personal information data base. As a result, the merit that it is possible to joyfully acquire useful information is provided.

Further, in this invention, the agent access server analyses information which has been accessed to select dedicated server in accordance with its analysis result to send out access information to this dedicated server, and to send out answer information from this dedicated server to access destination. The dedicated server stores personal information from the agent access server to select information useful for user on the basis of personal information to send out the selected information to the agent access server. Thus, for manager for information delivery system, direct connection to user can be made. As a result, it is possible to appeal to character of manager. In addition, the merit that it is possible to obtain very high accuracy profile is provided.

Still further objects of this invention and more practical merits obtained by this invention will be more apparent from the description of the embodiments which will be given below.

BRIEF DESCRIPTION OF THE DRAWINGS

FIGS. 4A to 4D are views showing examples of the configurations of respective data bases of dedicated server constituting an information delivery system according to this invention.

FIGS. 11A to 11C are explanatory views showing an example of the configuration of data at the time of transmission/reception between agent terminal and agent access server according to this invention.

BEST MODE FOR CARRYING OUT THE INVENTION

Preferred embodiments of this invention will now be described in detail with reference to FIGS. 1 to 27.

FIRST EMBODIMENT

Figure 1:
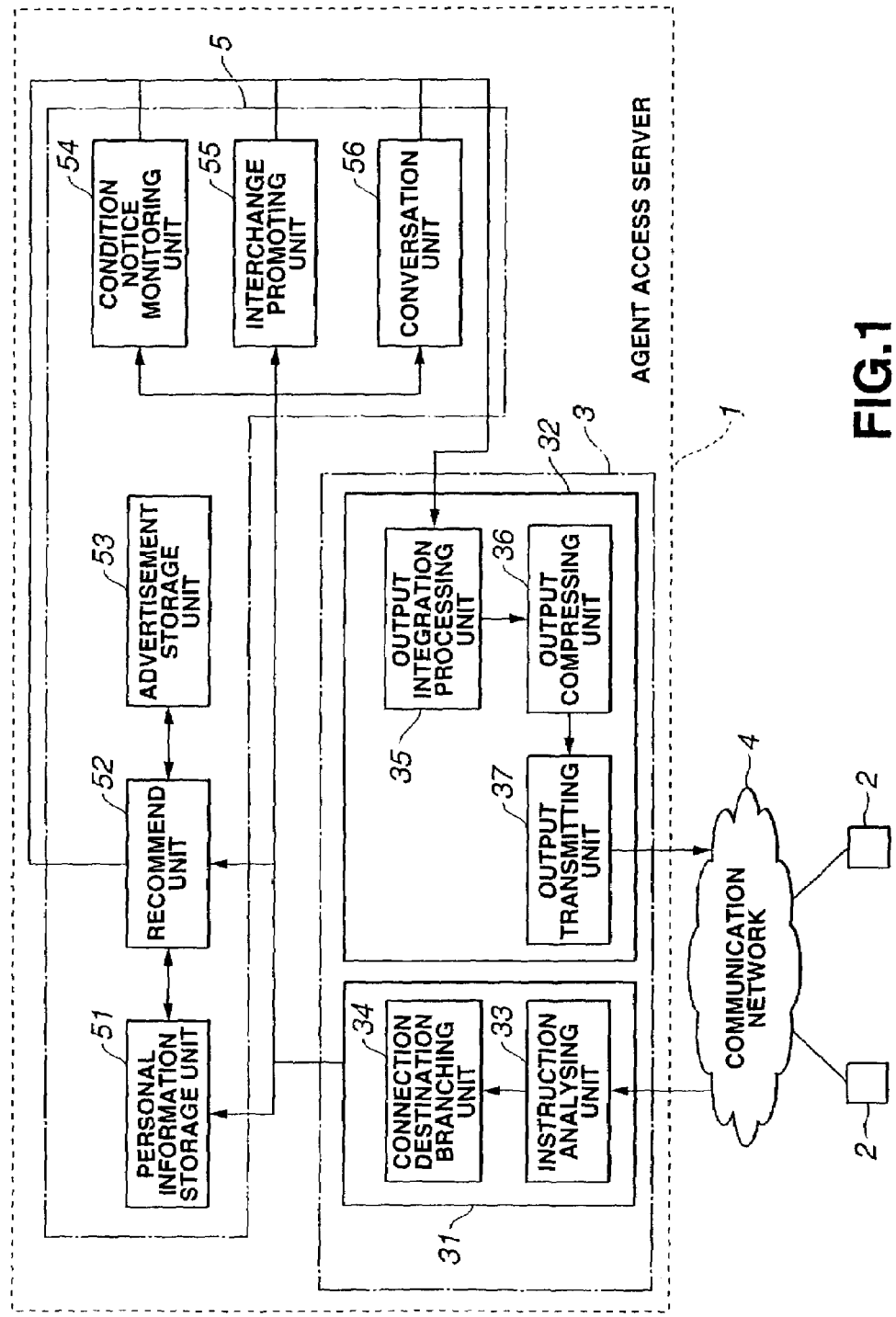
FIG. 1 is a block diagram showing an information communication system according to this invention.

FIG. 1 is a block diagram showing an information communication system to which this invention is applied. In FIG. 1, the information communication system is roughly composed of a delivery system 1 and agent terminals 2, 2, . . . .

The delivery system 1 is composed of an agent access server 3 for sending out arrangement result of information accessed from the agent terminal 2 or answer with respect to information to the agent terminal 2 serving as access destination, and a dedicated server 5 for specially processing access information sent from this agent access server 3 to send out its answer to the agent access server 3.

When explanation is further given, the information communication system is caused to be of configuration in which the agent terminals 2, 2, . . . of users and the agent access server 3 are connected through a communication network 4, and the dedicated server 5 for processing a predetermined special function is connected to this agent access server 3.

The agent terminals 2 are classified into terminals comprised of mobile terminals and terminals comprised of fixed terminals. The agent terminal 2 is composed of means for forming character of a predetermined shape to have ability to display the character, means for permitting conversation between character and user, means for transmitting personal information, etc. of user obtained through this conversation to the agent access server 3, and means for displaying information from the agent access server 3 in a form such that character introduces that information.

The agent access server 3 is comprised of computer system, whereon this computer processes agent access program so that analysis branching means 31 and output means 32 are realized. Thus, the agent access server 3 is assumed to comprise analysis branching means 31 for analysing access from the agent terminal 2 to select data base (its detail will be described later) within the dedicated server 5 optimum for this processing on the basis of its analysis result to send out information from the agent terminal 2 to the dedicated server 5 optimum for this processing, and output means 32 for sending out answer information from the dedicated server 5 optimum for this processing to this user terminal 2.

This analysis branching means 31 is composed of an instruction analysing unit 33 for analysing object of access from the agent terminal 2 and a connection destination branching unit 34 for branching connection in order to allow the dedicated server 5 suitable for this processing to entrust processing of information from the agent terminal 2 on the basis of analysis result from this instruction analysing unit 33.

Moreover, the output means 32 is composed of an output integration processing unit 35 for integrating answer information from the dedicated server 5 suitable for this processing, an output compressing unit 36 for compressing output information from this output integration processing unit 35 so that size optimum for transfer is provided, and an output transmitting unit 37 for transmitting the compressed information from this output compressing unit 36 to the agent terminal 2 to which access is provided.

The dedicated server 5 suitable for this processing comprises a personal information storage unit 51, a recommend unit 52, an advertisement storage unit 53, a condition notice monitoring unit 54, an interchange promoting unit 55, and a conversation unit 56.

Output of the connection destination branching unit 34 of the analysis branch means 31 of the agent access server 3 is connected to the personal information storage unit 51, the recommend unit 52, the condition notice monitoring unit 54, the interchange promoting unit 55 and the conversation unit 56 which constitute the dedicated server 5.

Respective outputs of the recommend unit 52, the condition notice monitoring unit 54, the interchange promoting unit 55 and the conversation unit 56 are connected to the output integration processing unit 35 of the output means 32 of the agent access server 3.

The personal information storage unit 51 is a server for constructing personal information data base (the detail will be described later), and this server processes dedicated processing program to thereby construct personal information data base (not shown) in FIG. 1 therewithin to store profiles of respective users or various parameters sent from the agent terminals 2, 2, . . . with respect to this personal information data base. In addition, this personal information storage unit 51 can offer necessary information to the recommend unit 52 by access from the recommend unit 52.

The recommend unit 52 is a server for realizing profiling engine (its detail will be described in detail), and this server processes dedicated processing program to thereby realize profiling engine (not shown) in FIG. 1 therewithin to execute processing for allowing taste of user and advertisement within the advertisement storage unit 53 to be in conformity with each other on the basis of personal information stored in the personal information storage unit 51 by this profiling engine to output its result to the output integration processing unit 35 of the output means 32 of the agent access server 3.

The advertisement storage unit 53 is comprised of computer system, and this computer system processes dedicated processing program to thereby construct advertisement data base (its detail will be described later) (not shown) in FIG. 1 therewithin to execute processing for storing text document, advertisement constituted with still picture or moving picture or other data with respect to this advertisement data base.

The condition notice monitoring unit 54 is a server for realizing condition notice engine (its detail will be described later), and this server processes dedicated processing program to thereby realize condition notice engine (not shown) in FIG. 1 therewithin to execute processing for monitoring a portion of web by this condition notice engine and for notifying corresponding condition to any one of agent terminals 2, 2, . . . of this user through the output means 32 of the agent access server 3 when designation of monitoring condition can be made and the condition is changed.

The interchange promoting unit 55 is a server for realizing communication engine (its detail will be described later), and this server processes dedicated processing program to thereby realize communication engine (not shown) in FIG. 1 therewithin to execute, by this communication engine, processing for chatting with a person who has the same interest, carrying out publication or perusal of notice board, publishing home page of user himself, or connecting agent terminals 2, 2, . . . through the agent access server 3.

The conversation unit 56 is a server for constructing conversation data base (its detail will be described later), and this server processes dedicated processing program to thereby construct conversation data base (not shown) in FIG. 1 therewithin to have ability to carry out management of conversation of character of the pet type at the agent units 2, 2, . . . through the agent access server 3 to sequentially update it to have ability to supplement new conversation.

Figure 2:
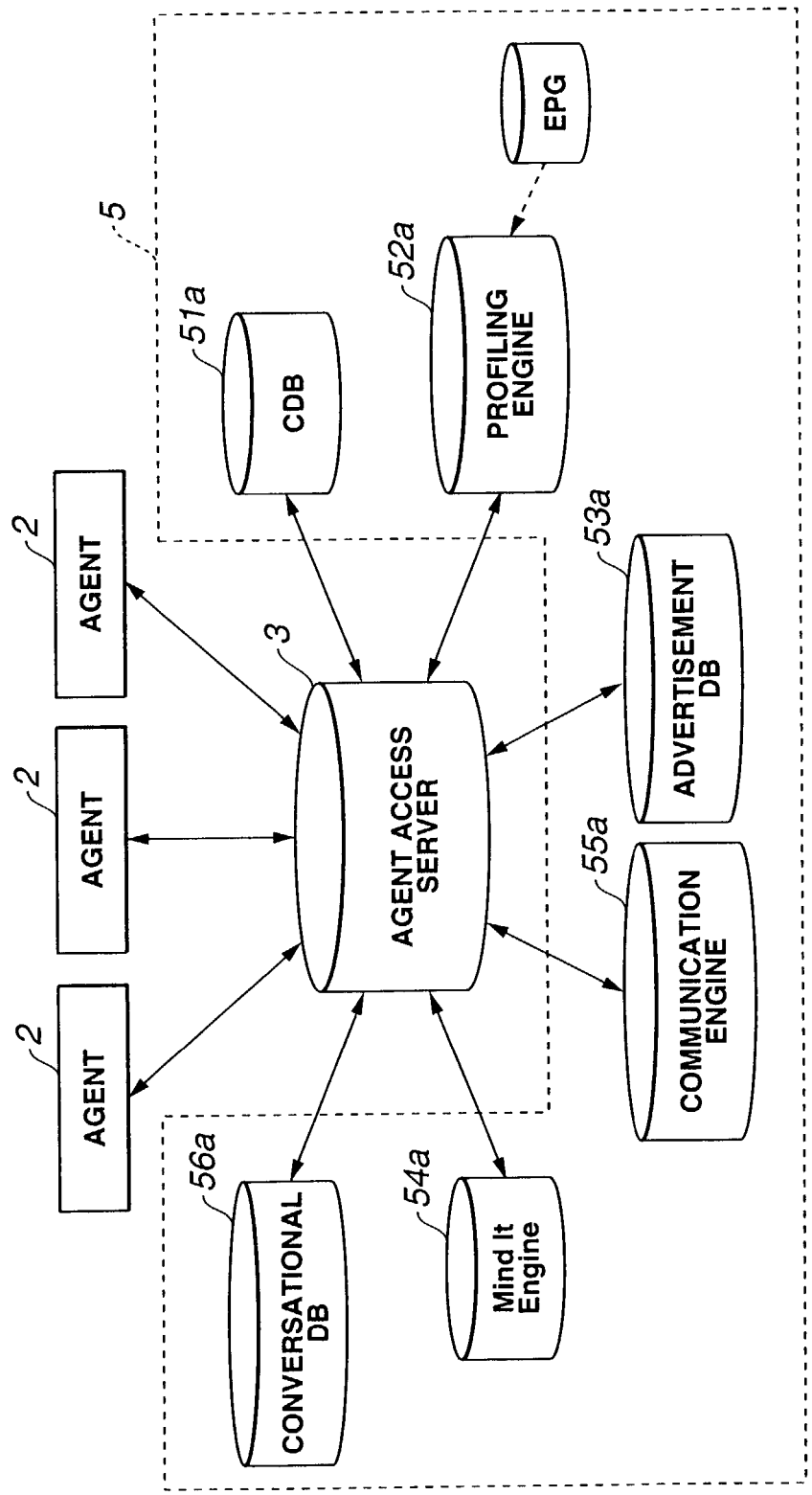
FIG. 2 is a related view of server constituting the information communication system according to this invention.

FIG. 2 is a related diagram of server which constitutes the information communication system according to this invention.

In FIG. 2, respective agent terminals 2, 2, . . . can provide access to the agent access server 3. This agent access server 3 analyses object of access of the agent terminal 2 to select the above-described personal information data base 51a, profiling engine 52a, condition notice engine (Mind It Engine) 54a, communication engine 55a or conversational data base 56a as the result of the analysis to allow this selected dedicated processing means, etc. (51a, 52a, 54a, 55a or 56a) to entrust processing of information from the agent terminal 2 to have ability to transmit, to this agent terminal 2, answer from this selected personal information data base 51a, profiling engine 52a, condition notice engine 54a, communication engine 55a or communication data base 56a which is component of the dedicated server 5.

It is to be noted that while advertisement data base 53a can be directly accessed by the agent access server 3 in the example shown in FIG. 2, there is employed in practice a form such that the profiling engine 52a selects advertisement of the advertisement data base 53a on the basis of information of the personal information data base 51a to output that advertisement to the agent access server 3.

From a different point of view, it can be said that the above-described agent access server 2 is a unit which carries out traffic control between the agent terminal 2 and the personal information data base 51a, the profiling engine 52a, the condition notice engine 54a, the communication engine 55a or the conversational data base 56a.

More practical explanation of respective dedicated processing means, etc. will now be described. First, the personal information data base 51a is realized by the personal information storage unit 51, and personal information of respective users and/or other parameters, etc. obtained from the agent access server 3 are stored under control of the personal information storage unit 51 with respect to the personal information data base 51a. In addition, the personal information data base 51a is adapted to have ability to take out personal information and/or other parameters, etc. stored in the personal information data base 51a itself under control of the personal information storage unit 51.

The profiling engine 52a is realized by the recommend unit 52, and this profiling engine 52a is adapted to have ability to carry out matching between taste of user and advertisement stored in advertisement data base 53a by using parameter for recommend stored in the personal information data base 51a within the personal information storage unit 51.

The advertisement data base 53a is formed by the advertisement storage unit 53, and text document, advertisement prepared by still picture or moving picture, etc. and/or other parameters are stored in this advertisement data base 53a and advertisement is related to this advertisement data base 53a by key word, etc.

The condition notice engine 54a is realized by the condition notice monitoring unit 54, and this condition notice engine 54a is adapted to have ability to monitor a portion of web and/or change monitoring condition.

The communication engine 55a is realized by the interchange promoting unit 55, and this communication engine 55a executes a function to have ability to carry out a chat with a person who has the same interest, a function to notice the notice board to have ability to retrieve the notice board, and/or a function capable of publishing home page, etc.

The conversational data base 56a is constructed by the conversation unit 56, and contents of conversation between character of the pet type and user realized in the agent units 2, 2, . . . are stored in the conversational data base 56a. Thus, it is possible to advance highly the content of conversation of character of the pet type.

Figure 3A:
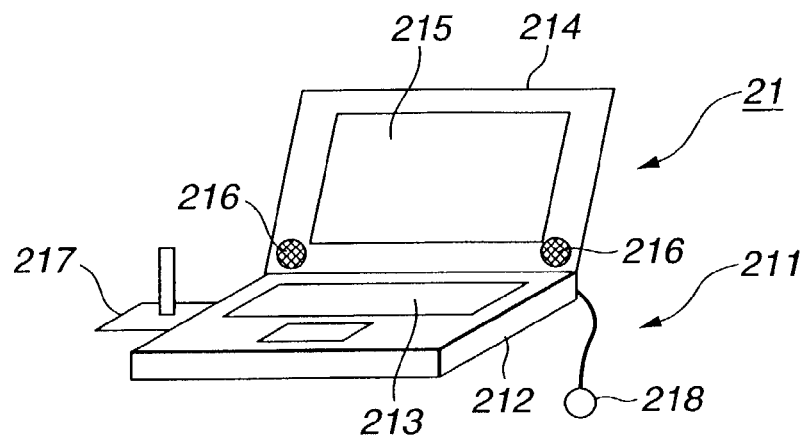
FIGS. 3A and 3B are views showing examples of the configurations of agent terminals constituting the information communication system according to this invention.
Figure 3B:
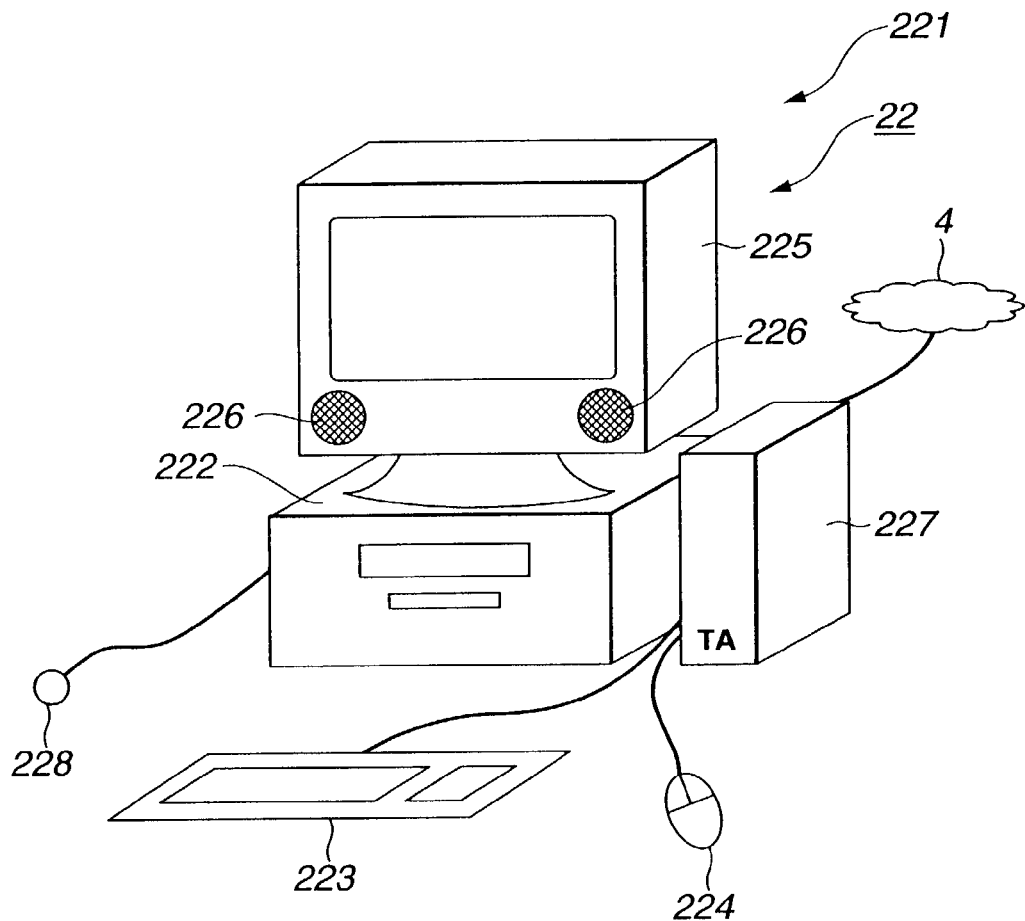

FIG. 3 is a view showing an example of the configuration of the agent terminal which constitutes the information communication system according to this invention, wherein FIG. 3A shows an example of a mobile terminal and FIG. 3B shows an example of a fixed terminal.

In this FIG. 3A, mobile terminal 21 which realizes the agent terminal 2 is a terminal constituted by, e.g., note type personal computer of B5 file size. This note type personal computer 211 is caused to be of configuration in which a keyboard 213 is disposed at a personal computer body 212. A cover 214 is provided at this personal computer body 212 so that it can be opened and closed, and a liquid crystal display 215 and speakers 216, 216 are provided at one surface of this cover 214. Moreover, a wireless data communication card 217 is attached at the side surface of the personal computer body 212 so that connection to the communication network 4 can be made by wireless. Further, a microphone 218 is connected to the note type personal computer 211 so that voice can be inputted.

Here, wireless should be interpreted in a broad sense, and configurations capable of carrying out, by wireless, transmission/reception of information to and from base station connected to the above-described communication network 4 may be all included. As examples, there are mentioned mobile body communication system such as pocket telephone, PHS (Personal Handyphone System) (Registered Trade Mark) which is one example of the simplicity type pocket telephone system using very week radio wave, etc., wireless LAN such as WLL (Wireless Local Loop), Bluetooth (Trade Mark), etc., and system by infrared communication such as IrDA (Infrared Data Association), etc. It is a matter of course that the agent access server 3 may doble as the above-described base station.

Within this personal computer body 212, although not shown, there are included Central Processing Unit (CPU) for executing various arithmetic processing, main memory for developing and storing program to deliver it to the CPU, ROM for storing basic program, AD converter for converting voice into digital signal, hard disc unit for storing programs and/or various data, sound source board for generating voice from digital signal, CD-ROM for taking data or programs thereinto or storing them, CD-R, and CD-RW drive unit capable of reading CD-RW.

Within the hard disc unit of the note type personal computer 211 at this mobile terminal 21, several kinds of agent programs caused to be different in character are stored. Respective agent programs consist of programs of the form to form character of pet type, robot type, human being type (e.g., secretary) or other form to display the character on desk-top screen in a manner permanently stationed, and programs of the form to form character of pet type, robot type, human being type or other form to display the character on the task bar of display in a manner permanently stationed. Moreover, the above-mentioned respective agent programs may consist of only programs of the form to allow user to select permanent stationing or non-permanent stationing with respect to the task bar.

Further, the respective agent programs preferably have a shape generating function to have a conversation of the form in which user calls out to character by keyboard input, etc. between the user and character of pet shape, etc. and the character displays answer on the liquid crystal display 215 to thereby gradually enlarge the character of pet shape, etc. in accordance with a predetermined parameter, a personal information sending function to send, to the agent access server 3, information obtained from user as the result of the fact that conversation is made between the character and the user, a mail receiving monitor function to monitor receiving of mail, an advertisement retrieval function to request retrieval of advertisement that user desires to take advertisement of retrieval result thereinto, a dictionary retrieval function with respect to dictionary that user requires, an alarm function based on various setting, a music reproducing function, a communication function for carrying out chat or looking at notice board, a schedule management function, and a game function to play a game with character.

In addition, the respective agent programs may comprise a launcher function in which when "Start ○○ software", this software is automatically started, and a network connecting function to carry out connection to network.

In FIG. 3B, fixed terminal 22 which realizes the agent terminal 2 is constituted by, e.g., desk-top type personal computer. This desk-top type personal computer 221 is composed of a personal computer body 222, a keyboard 223 for data input, a mouse 224 serving as pointing device for carrying out movement designation of cursor pointer and designation input, a display 225 affixed to the personal computer body 222, speakers 226, 226 provided at the lower side of the screen of this display 225, a terminal adapter 227 for carrying out connection to the communication network 4, and a microphone 228 for inputting voice. It is to be noted that if the communication network 4 is LAN, LAN adapter (LAN board, LAN card, etc.) is used in place of the terminal adapter 227.

Within this personal computer body 222, although not shown, there are included CPU for executing various arithmetic processing, main memory for developing and storing program to deliver it to the CPU, ROM for storing basic program, AD converter for converting voice into digital signal to deliver it to the CPU, etc., hard disc for storing programs or various data, sound source board for generating voice from digital signal, CD-ROM for taking or storing data or programs thereinto, CD-R, CD-RW drive unit capable of reading CD-RW. Additionally, in the hard disc unit of the desk-top type personal computer 221 of this fixed terminal 22, similarly to the above-described note type personal computer 211, agent programs are stored.

FIGS. 4A to 4D are views showing examples of the configurations of respective data bases of dedicated server in the information delivery system according to the embodiment of this invention.

FIGS. 4A and 4B are views showing the configuration of personal information data base. In this FIG. 4A, in personal information data base 51a constructed by the personal information storage unit 51, there are stored, as basic information, identification code (ID) of agent terminal 511, kind 512 of pet, pet name 513, host name 514, age 515 of user, point 516, address 517 of user, interest 518 of user (weighting every item of interest of user), and occupational category 519 of user, etc.

In this personal information data base 51a, in the case where, e.g., ID 511 is "12345678", memory is carried out in such a manner that kind 512 of pet is "dog", pet name 513 is "pochi", host name 514 is "Ehchan", age 515 of user is "25", point 516 is "3500", and address 517 of user is "1-chome, ○○, Shinjuku-ku, TOKYO".

In FIG. 4B, in the personal information data base 51a, there are stored, as expansion information, key word 520, up-to-dateness 521, frequency 522, response ratio 523, degree of interest 524, related key word 525, and other information.

If, e.g., key word 520 is "personal computer", memory is carried out with respect to this personal information data base 51a in such a manner that up-to-dateness 521 is "2000/1/30", frequency 522 is "35", response ratio 523 is "3/10", degree of interest 524 is "90/100", and related key word 525 is "computer". Moreover, if, e.g., key word 520 is "rock", memory is carried out with respect to this personal information data base 51a in such a manner that up-to-dateness 521 is "2000/7/1", frequency 522 is "7", response ratio 523 is "1/5", degree of interest 524 is "10/100", and related key word 525 is "music".

FIG. 4C is a view showing an example of the configuration of advertisement data base. In this FIG. 4C, in advertisement data base 53a constructed by the advertisement storage unit 53, there are stored advertisement ID 540, advertiser 541, kind 542 of advertisement, key word 543, campaign enforcement date 544, campaign end date 545, response ratio 546, and advertisement genre and other items.

In the case where, e.g., advertisement ID 540 is "00001", memory is carried out with respect to this advertisement data base 53a in such a manner that advertiser 541 is "○○ company", kind 542 of advertisement is "Text", key word 543 is "PDA", campaign enforcement date 544 is "2000/1/1", campaign end date 545 is "2000/1/7", and response ratio 546 is "50/300". In the case where, e.g., advertisement ID 540 is "00002", memory is carried out in such a manner that advertiser 541 is "ΔΔ Company", kind 542 of advertisement is "moving picture", key word 543 is "shampoo", campaign enforcement date 544 is "2000/7/1", campaign end date is "2000/7/31", and response ratio 546 is "400/500".

FIG. 4D is a view showing an example of the configuration of conversation data base. In this FIG. 4D, key word 571, meaning 572, conversation content 573, conversation by agent terminals 574, age limit 575, and other item are stored with respect to conversation unit table 57a constructed by the conversation unit 56.

The operation of such an information delivery system will be described with reference to FIGS. 5 to 25 on the basis of FIGS. 1 to 4.

First, drawings used for explaining the operation of the information delivery system will be described. FIG. 5, FIGS. 12 to 18 and FIGS. 20 to 24 are views showing examples of pictures displayed on display of the agent terminal of the information delivery system of this invention.

Figure 6:
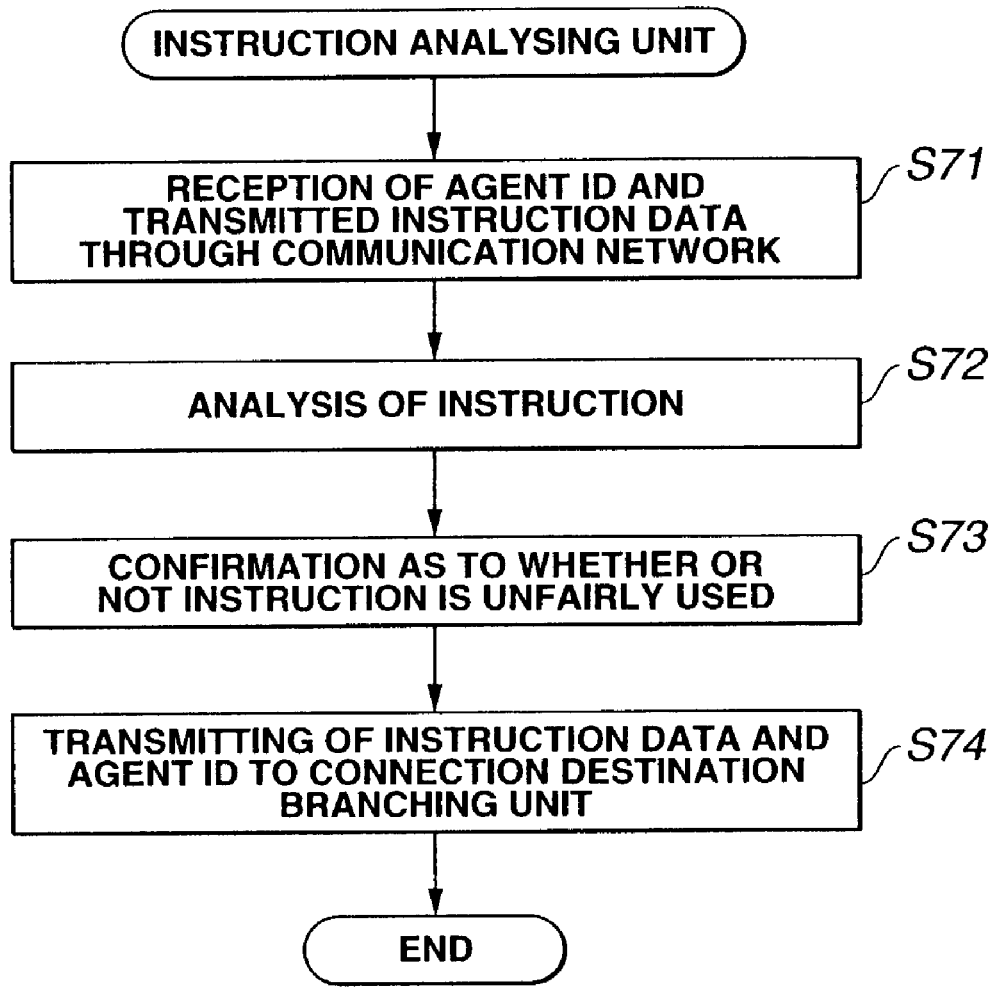
FIG. 6 is a flowchart for explaining the operation of instruction analysing unit of agent access server according to this invention.
Figure 7:
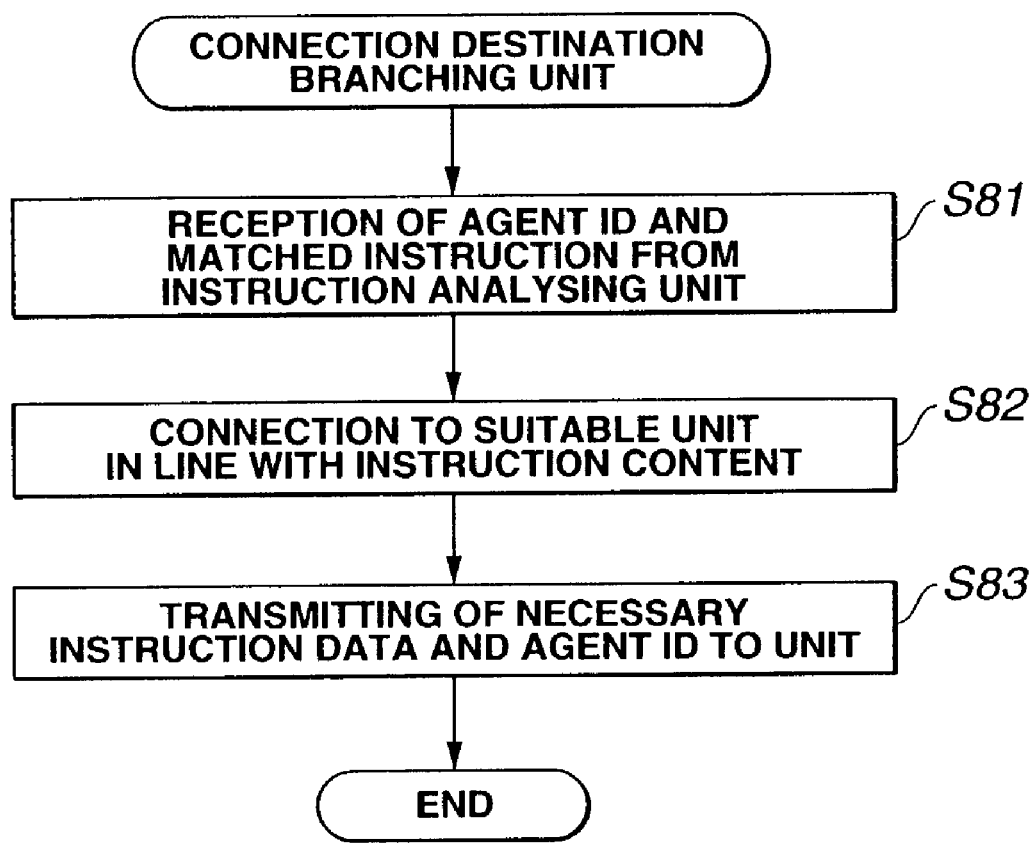
FIG. 7 is a flowchart for explaining the operation of connection destination branching unit of the agent access server according to this invention.

FIG. 6 is a flowchart for explaining the operation of instruction analysing unit of agent access server. FIG. 7 is a flowchart for explaining the operation of connection destination branching unit of the agent access server.

Figure 8:
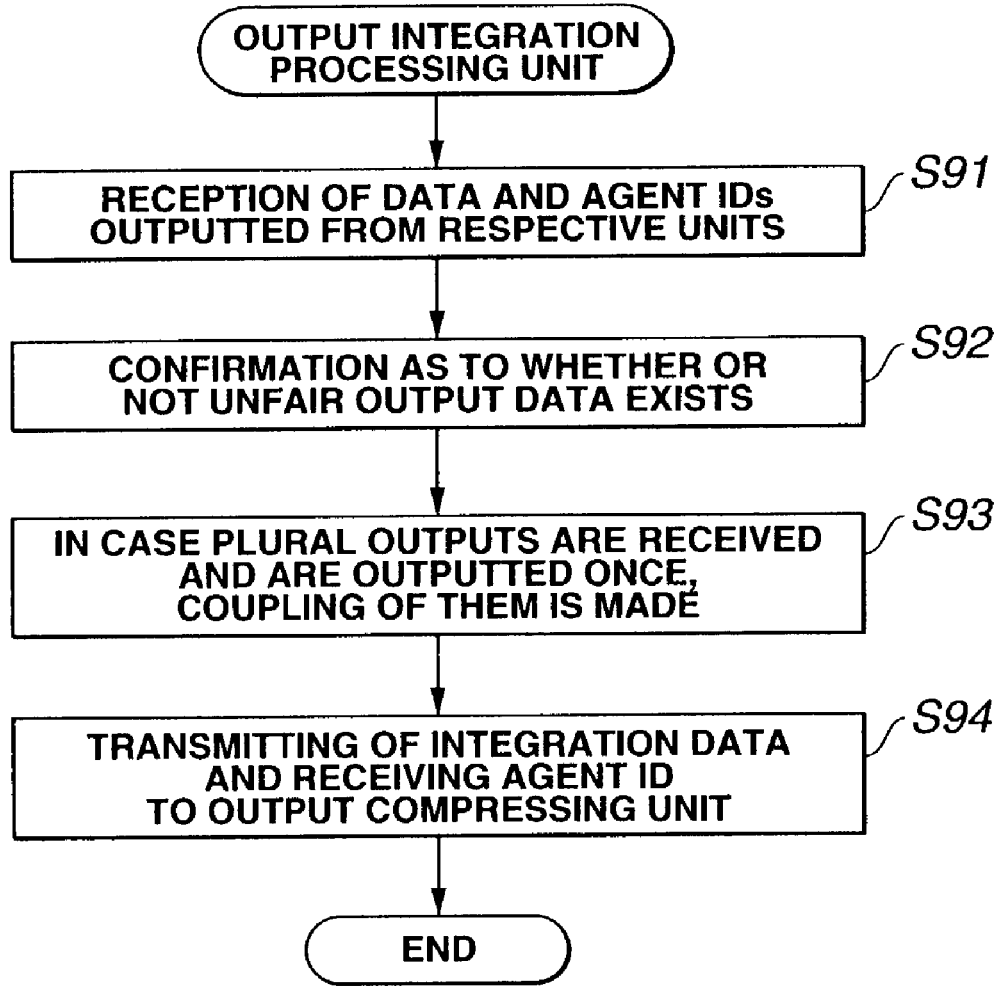
FIG. 8 is a flowchart for explaining the operation of output integration processing unit of the agent access server according to this invention.
Figure 9:
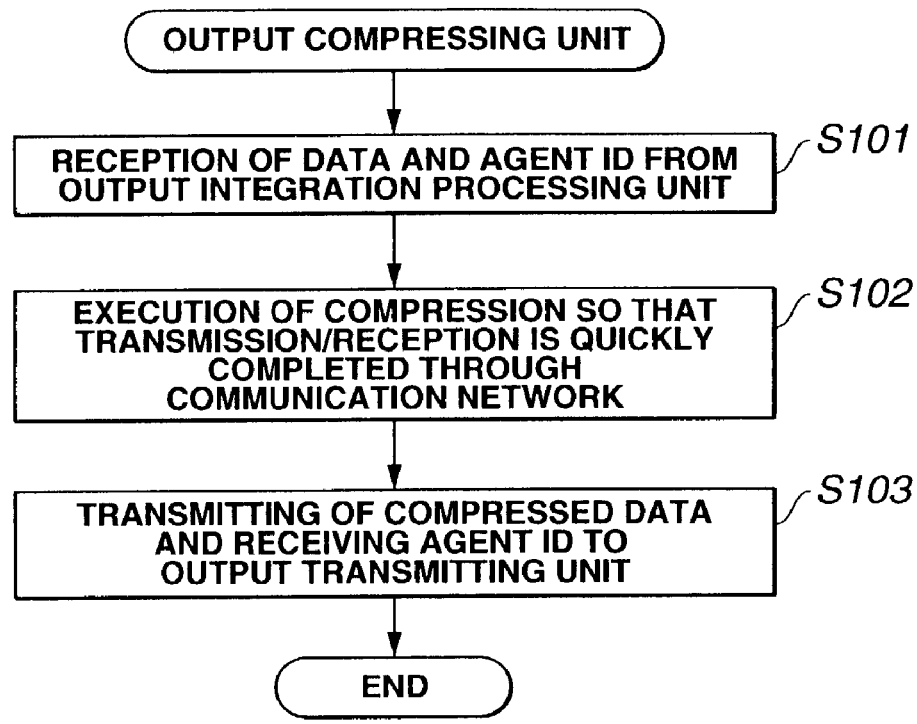
FIG. 9 is a flowchart for explaining the operation of output compressing unit of the agent access server according to this invention.
Figure 10:
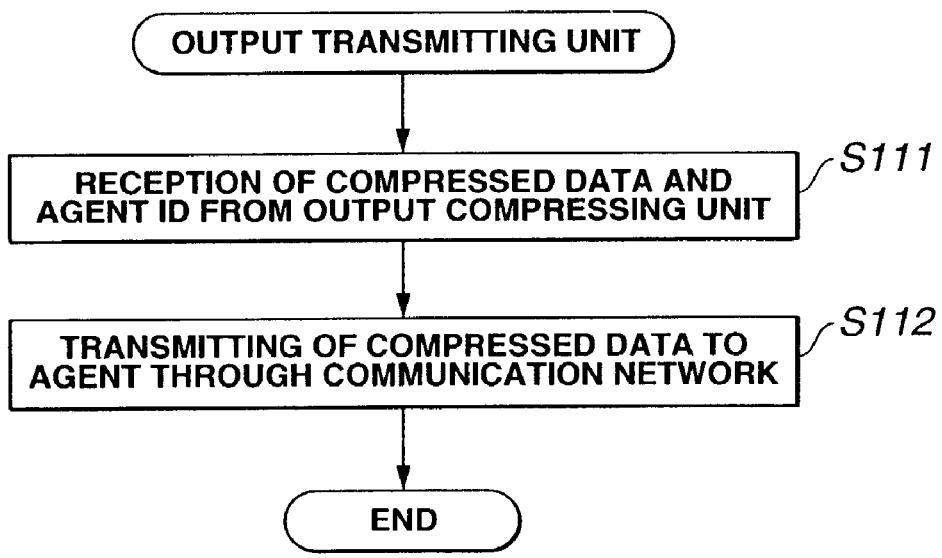
FIG. 10 is a flowchart for explaining the operation of output transmitting unit of the agent access server according to this invention.

In addition, FIG. 8 is a flowchart for explaining the operation of output integration processing unit of the agent access server. FIG. 9 is a flowchart for explaining the operation of output compressing unit of the agent access server. FIG. 10 is a flowchart for explaining the operation of output transmitting unit of the agent access server.

FIGS. 11A to 11C are explanatory views showing examples of configurations of data at the time of transmission/reception between the agent terminal and the agent access server.

(Operation Immediately after Agent Program is Installed at the Agent Terminal)

Here, explanation will be given on the assumption that the agent terminal 2 is constituted by, e.g., fixed terminal 22. The agent program is installed with respect to the hard disc unit of the desk-top type personal computer 221 to start this agent program.

Figure 5:
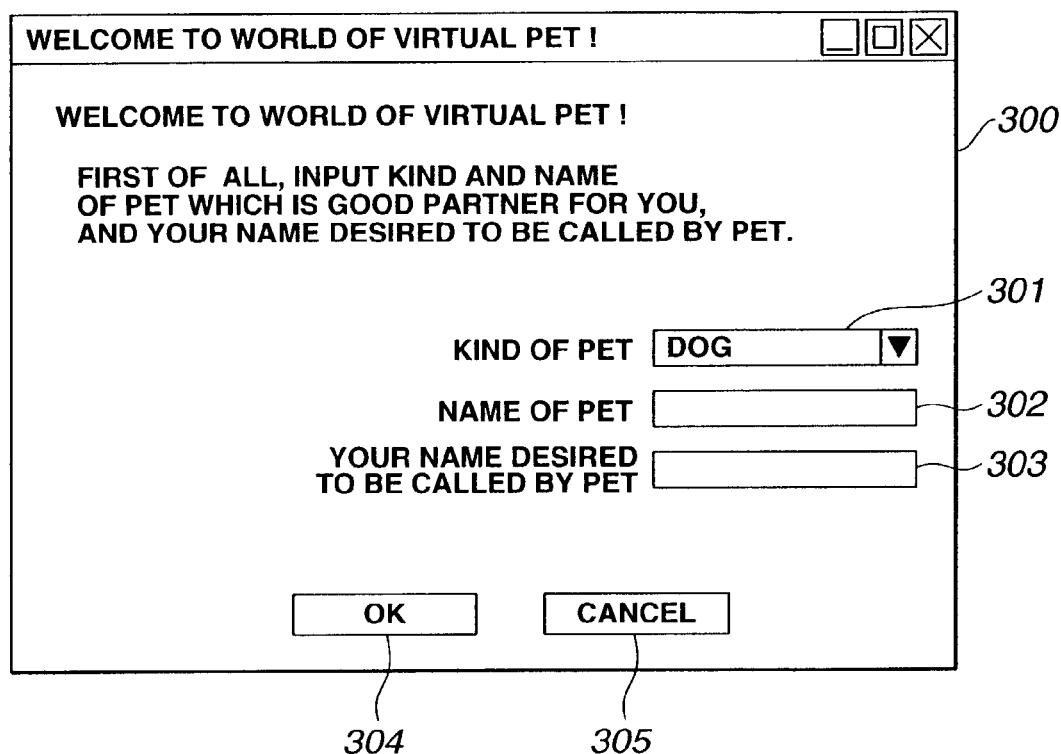
FIG. 5 is a view showing picture displayed on display of agent terminal constituting the information delivery system according to this invention.

Thus, the CPU of the desk-top type personal computer 221 displays initial picture as shown in FIG. 5 on the display 225.

Within the picture 300 displayed on this display 225, there are provided an input window 301 in which "Welcome to world of virtual pet!" is displayed, explanation of picture is displayed and "kind of pet" is described, an input window 302 in which "name of pet" is described, an input window 303 in which "Your name desired to be called by pet" is described, an "OK" button 304, and a "cancel" button 305.

Here, user operates the keyboard to input kind of pet within the input window 301, name of pet within the input window 302 and way of calling, etc. of user (himself) within the input window 303, whereby when those inputted items are OK, user pushes down the "OK" button 304. The input window 301 is caused to be of drop down menu, and user selects pet from the menu.

Thus, "kind of pet", "name of pet" and "way of calling of user" are stored with respect to data base of the agent program of the hard disc unit of the desk-top type personal computer 221 constituting the agent terminal 2.

Here, user operates the keyboard, etc. to give command to the effect of connection to the agent access server 3 to the agent program executed by the CPU of the desk-top type personal computer 221.

Thus, the CPU of the desk-top type personal computer 221 constituting the agent terminal 2 processes the agent program to activate communication function of this personal computer 221 to make connection to the agent access server 3 through the communication network 4 to request the agent access server 3 to carry out initialize operation, and to send out inputted data of "kind of pet", "name of pet" and "way of calling of user".

At this time, the desk-top type personal computer 221 constituting the agent terminal 2 sends out data of a form as shown in FIG. 11A to the agent access server 3.

In FIG. 11A, data form sent out from the agent terminal 2 is a form such that, e.g., "12345678" is set as 'agent ID', "initialize" is set as 'object instruction', "dog" is set as 'first parameter', "pochi" is set as 'second parameter' . . . . In this case, the agent ID is agent ID for sign up, and is set to fixed value irrespective of the agent terminal 2.

The instruction analysing unit 33 of the analysis branching means 31 of the agent access server 3 receives agent ID of data sent and instruction data transmitted through the communication network 4 (step S71). Processing by the instruction analysing unit 33 shifts to the subsequent step.

Then, the instruction analysing unit 33 analyses instruction (step S72). The instruction analysing unit 33 confirms whether or not instruction is unfairly used (step S73). In this case, since the instruction is initialized, the instruction analysing unit 33 accepts this instruction and issues agent ID peculiar to the agent terminal 2 to send out the agent ID and sent information to the connection destination branching unit 34 (step S74).

Thus, the connection destination branching unit 34 receives agent ID, matched instruction, and sent information from the instruction analysing unit 33 (step S81). The connection destination branching unit 34 makes connection to processing means suitable for this processing (In this case, the personal information storage unit 51) in line with instruction content (step S82). The connection destination branching unit 34 transmits necessary instruction data, agent ID and sent information to processing means suitable for this processing (In this case, the personal information storage unit 51) (step S83).

Thus, data base parameter as shown in FIG. 4A is stored with respect to the personal information data base 51a of the personal information storage unit 51.

Moreover, the personal information storage unit 51 delivers agent ID registered in the personal information data base 51a and registered information to the output integration processing unit 35 of the output means 32 of the agent access server 3 through the recommend unit 52.

The output integration processing unit 35 receives data and agent ID from respective units (In this case, the personal information storage unit 51) (step S91). The output integration processing unit 35 confirms whether or not unfair or improper output data exits (step S92). The output integration processing unit 35 is operative so that in the case where it receives plural outputs to output them once, it integrates or couples them (step S93). The output integration processing unit 35 transmits integration data and receiving agent ID to the output compressing unit 36 (step S94).

Thus, the output compressing unit 36 receives data and agent ID from the output integration processing unit 35 (step S101). The output compressing unit 36 compresses these data, etc. so as to have ability to quickly carry out transmission/reception thereof through the communication network 4 (step S102). The output compressing unit 36 transmits compressed data and the agent ID to the output transmitting unit 37 (step S103).

The output transmitting unit 37 receives the compressed data and the agent ID from the output compressing unit 36 (step S111). The output transmitting unit 37 transmits the compressed data to the agent terminal 2 having this agent ID on the basis of the agent ID (step S112).

At this time, the output transmitting unit 37 of the agent access server 3 sends out data of a form as shown in FIG. 11B to the agent terminal 2. In FIG. 11B, data form sent out from the output transmitting unit 37 of the agent access server 3 is a form such that, e.g., "98765432" is set as 'agent ID', "initialize" is set as 'object instruction', "dog" is set as 'first parameter', and "pochi" is set as 'second parameter'.

Then, since corresponding operation is operation of "initialize", the CPU of this agent terminal 2 temporarily stores sent agent ID, and defrosts compressed data to carry out comparison between this data and data stored in the agent program.

The CPU of this agent terminal 2 is operative so that if comparison result has no problem, it stores the agent ID which has been temporarily stored with respect to data base of the agent program to complete a series of processing of initialize. When information which has been transmitted from the agent access server 3 side is different from information stored with respect to the data base of the agent program, processing will be repeated from the beginning for a second time.

(General Operation of the Information Communication System)

Figure 12:
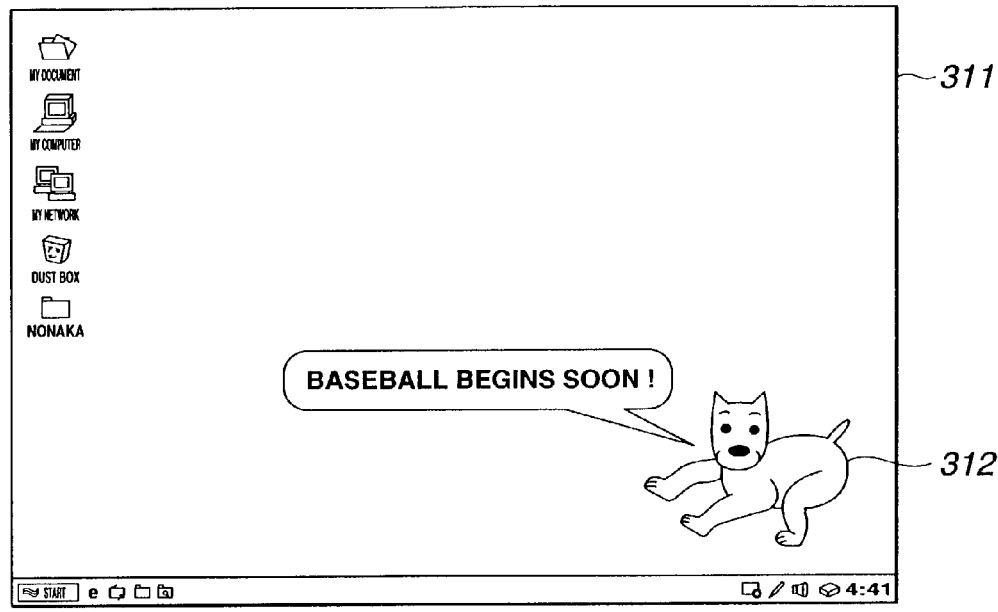
FIGS. 12 to 18 are views respectively showing examples of pictures displayed on display of agent terminal constituting the information delivery system according to this invention.
Figure 13:
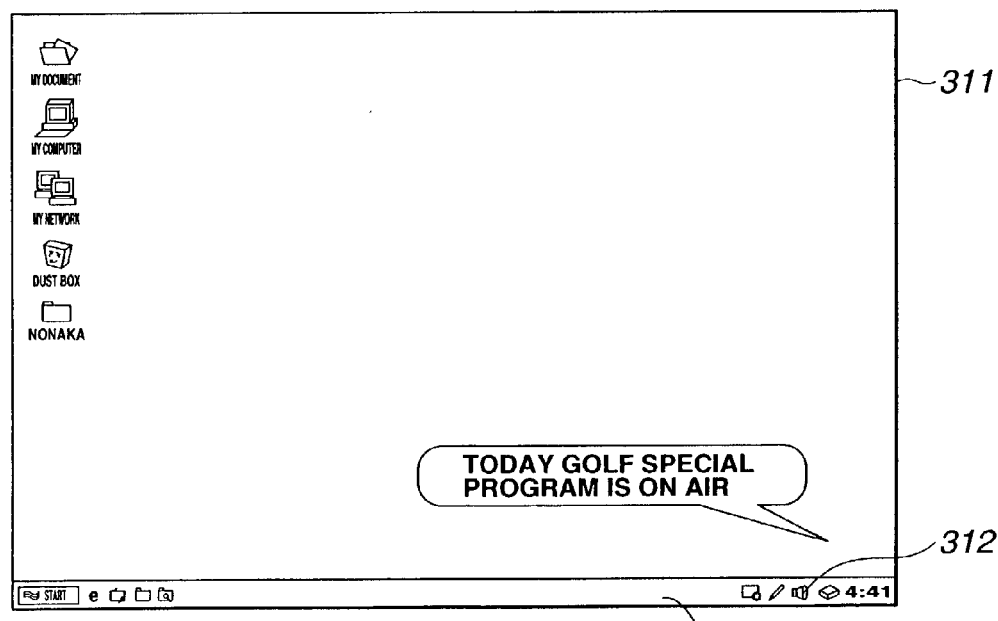

First, it is assumed that user operates the keyboard 223 of the desk-top type personal computer 221 constituting the agent terminal 2 to start agent program. Thus, the CPU of the desk-top type personal computer 221 displays, e.g., picture 311 as shown in FIG. 12 on the display 225. In this picture, character 312 of the pet type is displayed in a form such that it is permanently stationed on the desk-top screen. It is to be noted that character 312 may be displayed, e.g., on task bar 313 as shown in FIG. 13 so that it becomes inconspicuous.

Then, it is assumed that user operates the keyboard 223 of the desk-top personal computer 221 to input command for making connection to the network to the CPU of the desk-top type personal computer 221.

Thus, the CPU of the desk-top type personal computer displays character, carries out display in a display form such that character explains that "connection to the network is being examined", etc., and automatically recognizes whether or not connection to the network is made to provide access to the agent access server 3 by using agent ID, object instruction and key word with a designated frequency.

The instruction analysing unit 33 of the analysis branching means 31 of the agent access server 3 analyses and judges object of access of the agent terminal 2 to output its result to the connection destination branching unit 34. This connection destination branching unit 34 selects data base, etc. of dedicated server 5 optimum for that processing to transfer information from the agent terminal 2 to data base, etc. of this dedicated server 5.

The data base, etc. of this dedicated server 5 to which information has been transferred is processed in conformity with object and key word to transmit answer data of its processed result to the output integration processing unit 35. This output integration processing unit 35 carries out integration processing, etc. thereafter to send its answer data to the output compressing unit 36. This output compressing unit 36 compresses the answer data to transfer it to the output transmitting unit 37. This output transmitting unit 37 transmits the answer data to the agent terminal 2 to which access is provided.

Thus, the CPU of the desk-top type personal computer 221 constituting the agent terminal 2 defrosts the received answer data to display the answer data on the display 225 in a display form as if character makes introduction.

This information communication system is operated as described above.

(Operation that the Agent Terminal Pushes Information or Advertisement)

The operation that the agent terminal pushes information or advertisement will now be described. While command to the effect that information or advertisement is desired is outputted from the user side in the example which will be explained here, this invention is not limited to such implementation, but there may be employed, e.g., an approach to automatically send information or advertisement to user at default.

First, it is assumed that user operates the keyboard 223 of the desk-top type personal computer 221 to make connection to network to the CPU of the desk-top type personal computer 221 to input specific key word, and to input command to the effect that information or advertisement is desired.

Thus, the CPU of the desk-top type personal computer 221 carries out a display in a display form such that character explains that "connection to the network is being examined", etc., and to automatically recognize whether or not connection to the network is made to provide access to the agent access server 3 by using the agent ID, object instruction (information or advertisement is desired) and key word with a designated frequency.

The instruction analysing unit 33 of the analysis branching means 31 of the agent access server 3 analyses the object instruction (information or advertisement is desired) of the agent terminal 2 to output its result to the connection destination branching unit 34. The connection destination branching unit 34 selects data base, etc. (In this case, the recommend unit 52) of the dedicated server 5 optimum for this processing in accordance with object instruction, and transfers key word to the recommend unit 52.

The recommend unit 52 makes connection to the agent terminal 2 through the agent access server 3 to acquire related key word similar to this key word and restricted key word in the state where character 312 of picture 311 on the display 225 of the desk-top type personal computer 221 is caused to intervene.

Alternatively, the recommend unit 52 acquires related key word by making reference to parameter for recommend (see FIG. 4B) existing at the personal information data base 51a of the personal information storage unit 51.

The recommend unit 52 determines priority rank of information to be recommended from four kinds of parameters of degree of interest, up-to-dateness, frequency and response ratio with the current degree of interest being as core. The recommend unit 52 retrieves advertisement data base 53a (see FIG. 4C) of the advertisement storage unit 53 from those information to extract advertisement to be recommended on the basis of information as to whether user likes or dislikes key word of advertisement data base 53a to transmit this advertisement to the agent terminal 2 through the agent access server 3.

Figure 14:
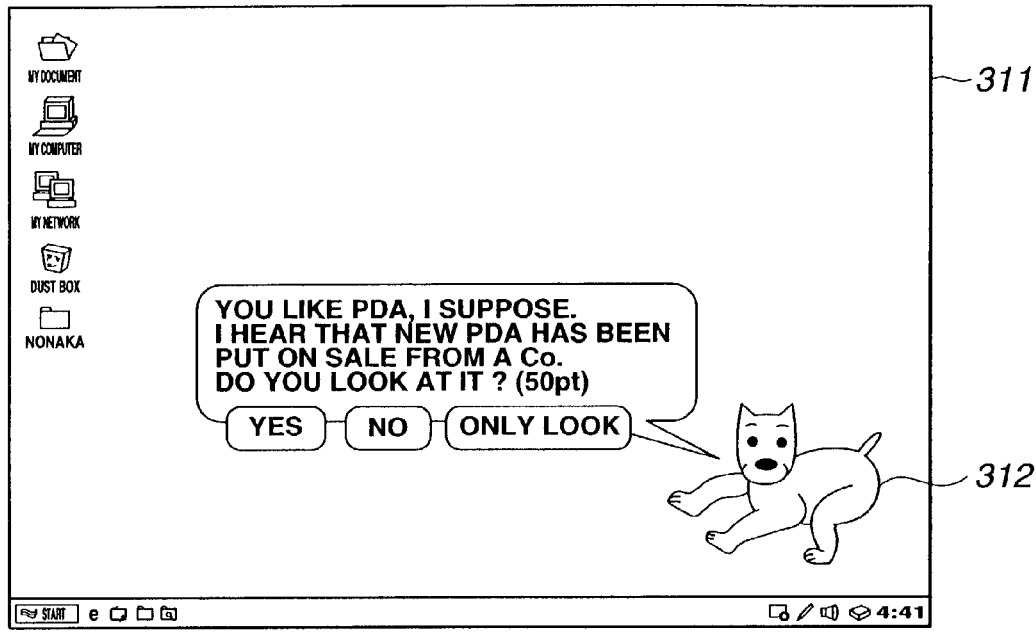

When the desk-top type personal computer 221 constituting the agent terminal 2 receives the advertisement data sent in this way, the CPU of the desk-top type personal computer 221 defrosts that advertisement data to display picture 311 as shown in FIG. 14 on the display 225.

As shown in FIG. 14, this picture 311 has a display form such that character 312 of the pet type introduces that "You like PDA, I suppose. I hear that new PDA has been put on sale from ○○ company. Do you look at it? (50 pt)".

Here, user clicks "only look" button, or "YES" button/"NO" button by the mouse 224. In the case where the "NO" button is clicked, the CPU of the desk-top type personal computer 221 deletes the introductory statement of the character 312.

In the case where the "YES" button is clicked, the CPU of the desk-top type personal computer 221 displays URL (Uniform Resource Locator), etc. obtained from the advertisement data base. At the displayed URL, there may be assembled, e.g., a mechanism such that browser is started as the result of the fact that user clicks URL by the mouse 224 to automatically provide access operation to this URL.

In this case, as a method of allowing the desk-top type personal computer 221 to display advertisement on the display 225, in addition to the above-described URL, display is made in such a manner that the character 312 of the pet type says, half to itself only by character, or display is made by moving picture like television commercial.

Morever, the CPU of the desk-top type personal computer 221 transmits response data of "only look" button or "YES" button/"NO" button to the agent access server 3.

The agent access server 3 transfers that response data to the advertisement data base 53a of the advertisement storage unit 53, and the advertisement data base 51a of the personal information storage unit 51. Thus, that response data is recorded with respect to the advertisement data base 53a and the personal information data base 51a. Moreover, the recommend unit 52 also stores response of user to carry out repetitive learning. For a function to carry out repetitive learning that this recommend unit 52 has, hierarchical neural network is used. For learning parameter for neural network, genetical algorithm is used to determine optimum value to enhance high speed characteristic and convergence stability of learning.

Figure 27:
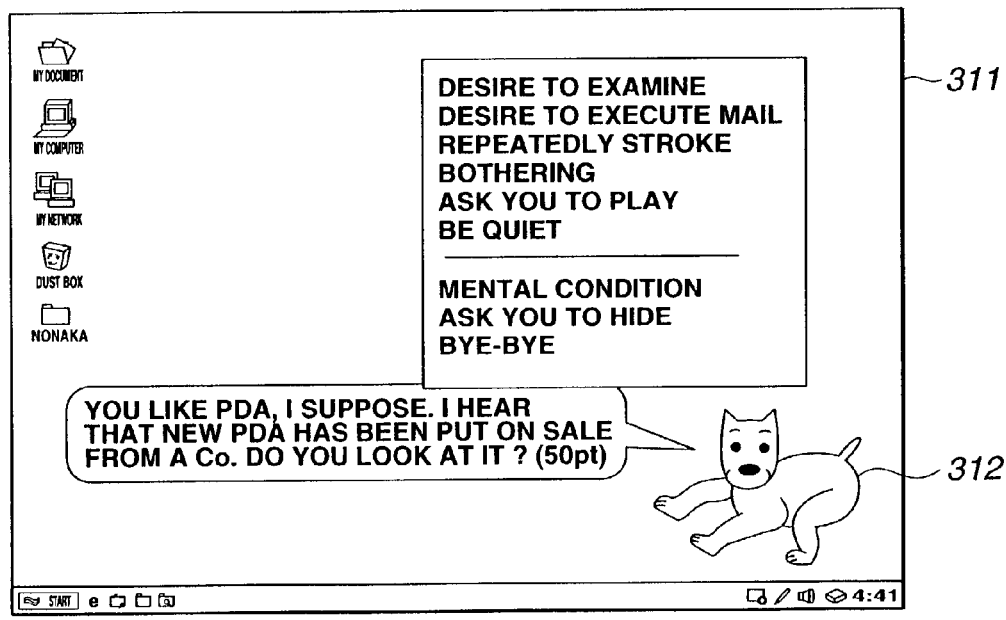
FIG. 27 is a view showing an example of picture displayed on display of agent terminal of the information delivery system according to this invention, wherein an example in which processing is carried out by right click of mouse is indicated.

In addition, as shown in FIG. 27, there may be employed an approach to display a predetermined matter by right click of mouse on picture so that user can select it.

It is to be noted that, at the advertisement storage unit 53, advertisement cost may be added to advertisement data base 53a to demand payment by monthly balance. In addition, in the case where there is cash back for user, point of point cumulative area of personal information data base 51a of the personal information storage unit 51 may be also added.

By operation as described above, it is possible to provide advertisement that user has interest. Additionally, when user inputs, in conversational form, request to the effect that "the quantity of advertisements is large" or "a larger number of advertisements is required" toward character 312 on picture 311 of the display 225 of the desk-top type personal computer 221 constituting the agent terminal 2, the desk-top type personal computer 221 constituting the agent terminal 2 increases or decreases frequency to output advertisement. This function to change advertisement output frequency may also rely on the function at the side of the agent access server 3 or the dedicated server 5.

By using the above-mentioned operation to push information or advertisement toward the agent terminals, the information delivery system of this embodiment can be applied to, e.g., video picture recording business. Namely, television program corresponding to taste of user is retrieved by the above-described operation to present this retrieval information on the display 225 of the desk-top type personal computer 221 constituting the agent terminal 2 in the state where character is caused to intervene.

Figure 15:
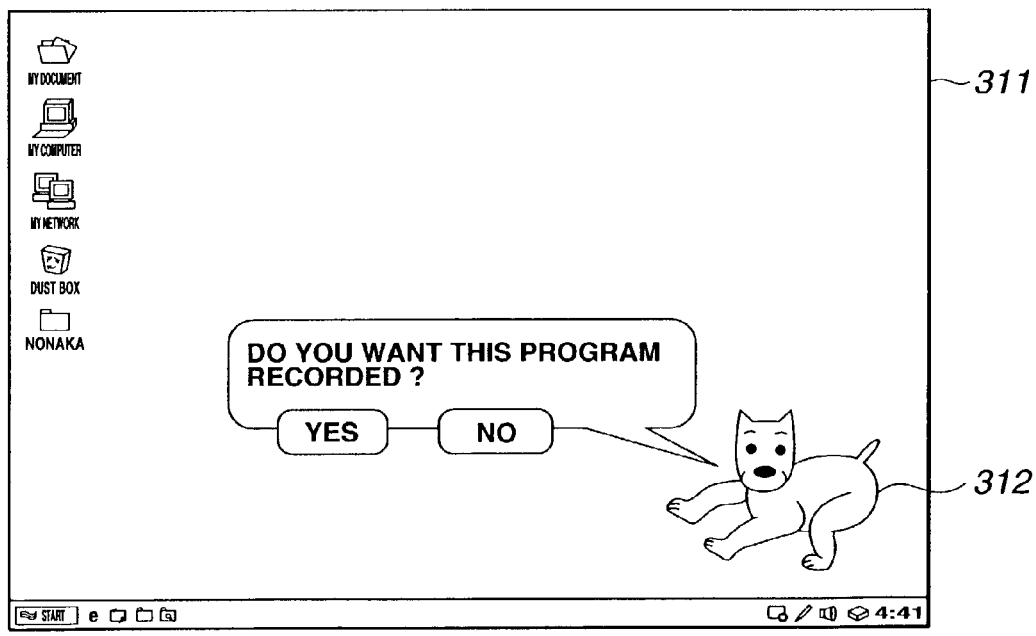

Then, the desk-top type personal computer 221 constituting the agent terminal 2 displays 2 character 312 within the picture 311 of the display 225 in such a manner that "Do you want this program recorded?" as shown in FIG. 15 to request user to push down either one of "YES" button/"NO" button.

When the "YES" button is clicked, the CPU of the desk-top type personal computer 221 constituting the agent terminal 2 allows a personal computer having picture recording function or a video deck having communication function to make reservation of picture recording.

By using the operation in this way, there is no possibility that user overlooks even program that he is apt to forget or he should not know.

By using the above-mentioned operation in which the agent terminal pushes information or advertisement, this invention can be applied to, e.g., music delivery business. Namely, since the personal information data base 51a and the recommend unit 52 grasp taste of user, the recommend unit 52 retrieves, by the operation to push information or advertisement, news or new tune corresponding to its taste, e.g., corresponding to artist to present this retrieval information on the display 225 of the desk-top type personal computer 221 constituting the agent terminal 2 in the state where character is caused to intervene.

Figure 16:
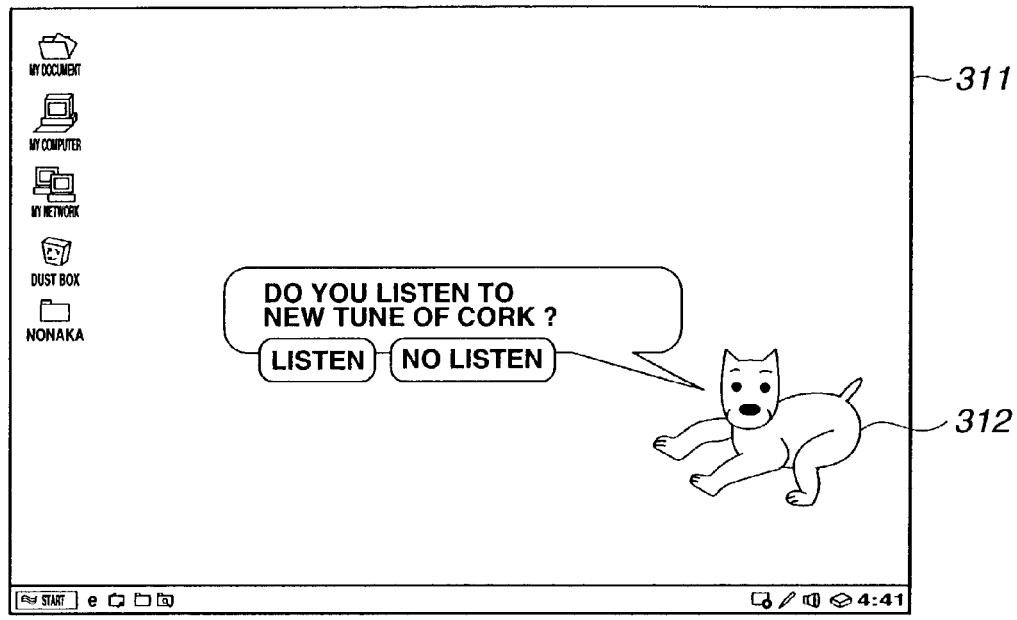

For example, as shown in FIG. 16, the desk-top type personal computer 221 constituting the agent terminal 2 displays character 312 within picture 311 of the display 225 in such a manner that "Do you listen to new tune of cork (name of cork is imaginary artist name, and real artist name is displayed in practice)?" to request user to push down either one of ""Listen" button?/"No Listen" button.

When the "Listen" button is clicked, the CPU of the desk-top type personal computer 221 constituting the agent terminal 2 acquires data for music delivery according to new tune of cork held in the agent access server 3, the dedicated server 5 and other server (not shown) connected to the communication network 4 to reproduce this new tune.

Moreover, after user carries out audition of new tune reproduced from the display 225 and the speakers 226, 226 of the desk-top type personal computer 221, the desk-top type personal computer 221 may display or connect purchase page of internet to have ability to purchase medium such as DVD (Digital Versatile Disc), etc. It is sufficient to provide URL of purchase page by the technique similar to the above-described technique for providing URL according to advertisement/information.

Alternatively, by using the operation to push information or advertisement toward the above-described agent terminal, it is possible to reproduce moving picture file, etc. such as favorite actor, etc. of user by the display 225 and the speakers 226, 226 under control of the desk-top type personal computer 221 constituting the agent terminal 2. There may be employed a configuration such that at the time point when this reproduction is completed, connection to ticket sale page of movie of internet is made so that user can purchase ticket.

(Operation that the Agent Terminal Collects User Information)

(Case Where the Fixed Terminal is Agent Terminal)

Figure 17:
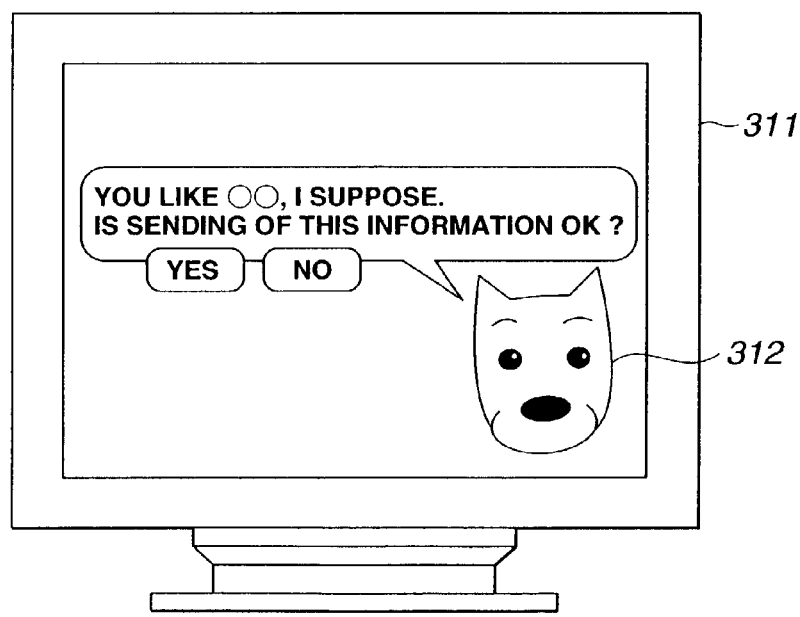

First, the CPU of the desk-top type personal computer 221 constituting the agent terminal 2 displays character on the display 225 to carry out conversation with user. When user inputs information that he likes ○○ to the desk-top type personal computer 221, the desk-top type personal computer 221 stores that information at the hard disc unit and displays picture 311 in which character 312 as shown in FIG. 17 is displayed.

At this picture 311, display is carried out in such a manner that character speaks that "You like ○○, I suppose. Is sending of this information OK?".

User clicks "YES" button/"NO" button by mouse, etc. The desk-top type personal computer 221 stores information of "YES/NO" at the hard disc unit.

Moreover, at the time of "YES", the desk-top type personal computer 221 transfers information of "You like ○○" to the agent access server 3.

The agent access server 3 transfers the information of "You like ○○" to the personal information storage unit 51. The personal information storage unit 51 allows the personal information data base 51a to store this information.

Figures 18, 19:
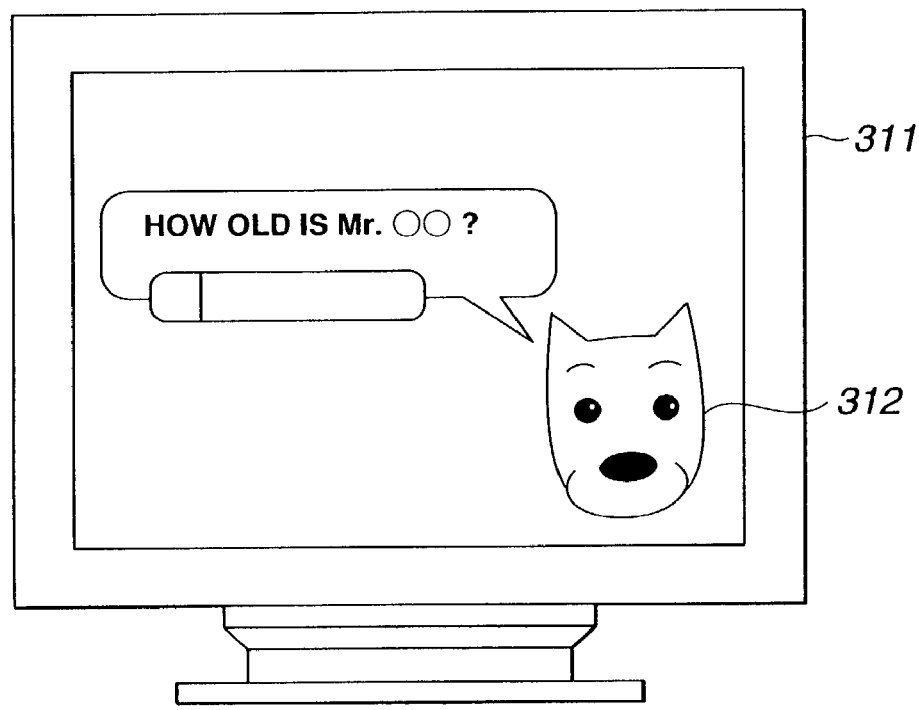
FIG. 19 is a view showing an example of the configuration of parameter of character stored in agent terminal of this invention.

It is to be noted that while the picture 311 shown in FIG. 17 is constituted as the button type, picture 311 may be constituted as text box type as shown in FIG. 18.

In accordance with the above-described agent terminal of the fixed terminal, only open personal information of user of the agent terminal 2 will be stored with respect to the personal information data base 51a of the personal information storage unit 51.

(Case of Agent Terminal of Portable Terminal (Mobile Terminal))

First, the CPU of the note type personal computer 211 constituting the agent terminal 2 displays character on the display 215 to carry out conversation with user. When user inputs information of "Your like ○○" to the note type personal computer 211, the note type personal computer 211 transfers this information to the agent access server 3.

This agent access server 3 transfers information of "You like ○○" to the personal information storage unit 51. The personal information storage unit 51 allows the personal information data base 51a to store this information.

In accordance with the agent terminal of the above-described portable terminal (mobile terminal), personal information of user of the agent terminal 2 is stored with respect to the personal information data base 51a of the personal information storage unit 51. Even in the case of this portable terminal, the right of selection as to whether or not this personal information is opened is at the user side.

(Growing Operation of Character)

With respect to the hard disc of the desk-top type personal computer 221 constituting the agent terminal 2, agent character parameter as shown in FIG. 19 is stored. As shown in FIG. 19, the character parameter 70 of this character consists of item 71 and weight (1 to 10) 72. There are "joyful", "anger", "sad", "degree of upbringing", . . . , at the item 71, and "7", "2", "4", "3", . . . are arranged at the weight 72 in correspondence with these matters.

It is to be assumed that the desk-top type personal computer 221 constituting the agent terminal 2 has artificial intelligence (AI) function by the operation of the above-described agent program to thereby allow the display 225 to display character to carry out display on the display 225 as if character speaks by this artificial intelligence to allow user to carry out input from the keyboard in response thereto to thereby carry out conversation. This is realized by allowing the CPU of the desk-top type personal computer 221 to prepare and process picture such that character speaks by key word stored within data base for conversation stored in the hard disc unit of the desk-top type personal computer 221. It is to be noted that, in this case, in place of employing a method of allowing user to carry out input from the keyboard, there may be employed a method of carrying out all operations by conversation unit using technology of speech (voice) recognition.

Figure 20:
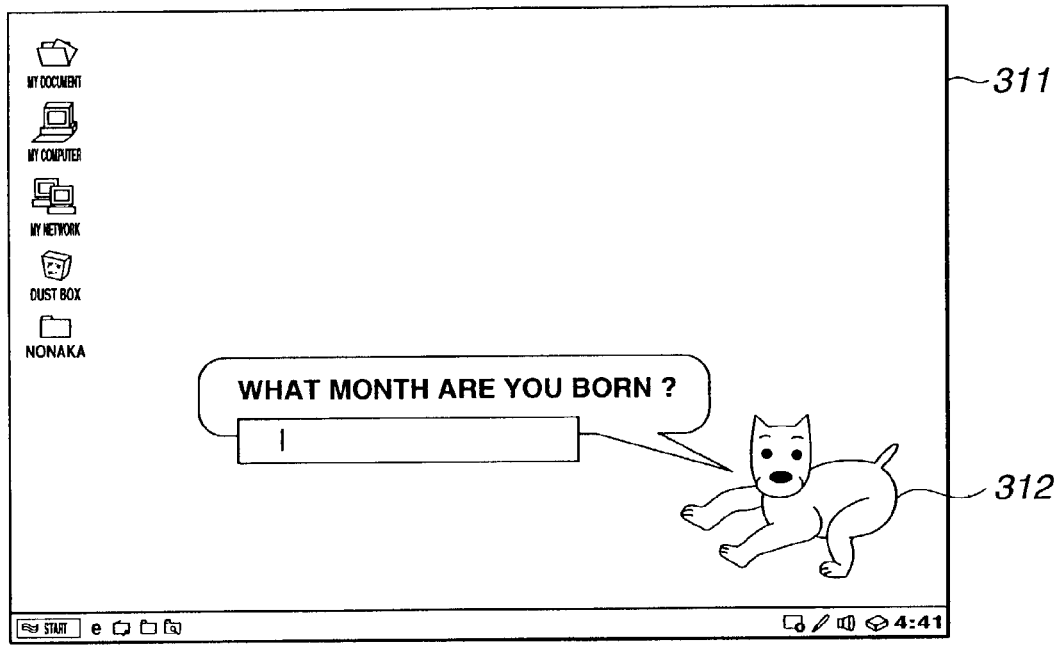
FIGS. 20 to 25 are views respectively showing examples of pictures displayed on display of agent terminal constituting the information delivery system according to this invention.

Thus, picture 311 such that character 312 as shown in FIG. 20 speaks "What month and what day are you born?" is displayed on the display 225.

Moreover, if corresponding information is key word existing at the data base for conversation of the hard disc unit of the desk-top type personal computer 221, the CPU of the desk-top type personal computer 221 continues conversation as it is.

In the case where corresponding information is key word that character does not know, i.e., key word does not exist in the data base for conversation of the hard disc unit of the desk-top type personal computer 221, the CPU of the desk-top type personal computer 221 forms a picture image in which character is caused to speak "I don't known" to display it. In the case where connection to the agent access server 3 is being made, key word that character does not know is transferred.

The agent access server 3 transfers this key word to the conversation unit 56.

In the case of key word existing in the conversational data base 56a, the conversation unit 56 outputs that key word to the agent access server 3. The agent access server 3 transfers this key word to the agent terminal 2.

In this case, if key word that character does not know is stored, it is sufficient to update the conversational data base 56a of the conversation unit 56 by batch processing.

The desk-top type personal computer 221 stores key word answered through the agent access server 3 from the conversation unit 56 with respect to data base for conversation of the hard disc unit.

Moreover, the CPU of the desk-top type personal computer 221 constituting the agent terminal 2 changes numeric value of weight 72 of character parameter of character of the pet type by the content of conversation with user. Namely, the desk-top type personal computer 221 has a function to change character parameter of character every time user and character carry out conversation, or character speaks. Thus, it looks that character substantially grows.

(Communication Function, Mail Receiving Function)

The agent terminal 2 constituted by this desk-top type personal computer 221 is connected to the interchange promoting unit 55 through the agent access server 3 so that it has communication function and mail receiving function.

First, the communication function will be described. User uses picture 311 of FIG. 21 displayed on the display 225 to carry out registration of friends or community. The picture 311 of FIG. 21 consists of picture 315 for friend and picture 316 for community.

The friend picture 315 is composed of friend register button, friend change button, friend delete button, message send button, chat button, personal home page look button, and friend list display area.

The community picture 316 is composed of register button, change button, delete button, conference attend button, home page look button, and community list display area.

Figure 21:
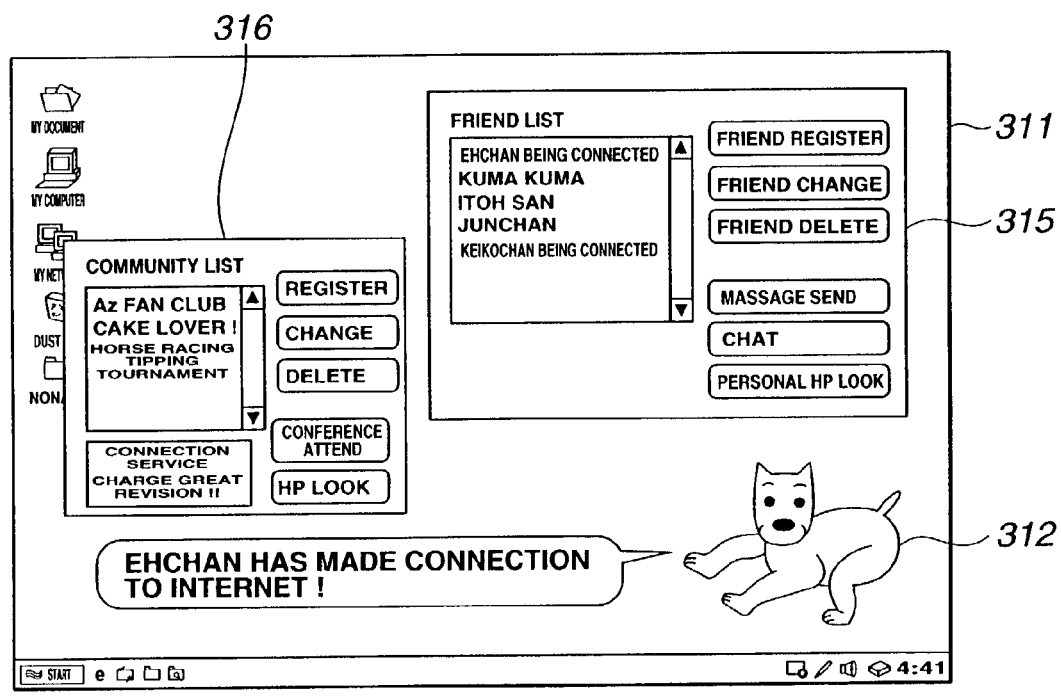

User uses the friend picture 315 of the picture shown in FIG. 21 to input in advance address of electronic mail of friend with respect to the desk-top type personal computer 221. This information is transferred to the interchange promoting unit 55 via the agent access server 3 from the desk-top type personal computer 221, and that information is registered.

Thus, the interchange promoting unit 55 notifies the desk-top type personal computer 221 constituting the agent terminal 2 through the agent access server 3 that the registered friend is being connected to the communication network 4.

Thus, the desk-top type personal computer 221 carries out display in such a manner that character 312 of picture 311 shown in FIG. 21 speaks that "Ehchan has made connection to internet".

In this case, this communication function can carry out transmission/reception of message to and from friend (see message send button), and carry out invitation to chat (chat button) as understood also from the picture 311 shown in FIG. 21. In addition, character can be of course used for chat, and speech chat using microphone 228 and speakers 226, 226 can be also carried out.

In this example, the above-described communication function is realized by, e.g., AOL (Trade Mark) instant messenger, and has a configuration such that user himeself and friend respectively make registration in advance at the interchange promoting unit 55, whereby when the agent program is started and the communication network 4 is connected, connection information is transmitted to the interchange promoting unit 55 so that connection notification is made to the opposite party registered as friend.

Then, the mail receiving function will be described. When mail is received to the mail server of the interchange promoting unit 55, the interchange promoting unit 55 transmits data to the effect that mail has been received to the desk-top type personal computer 221 constituting the agent terminal 2 through the agent access server 3.

Figure 22:
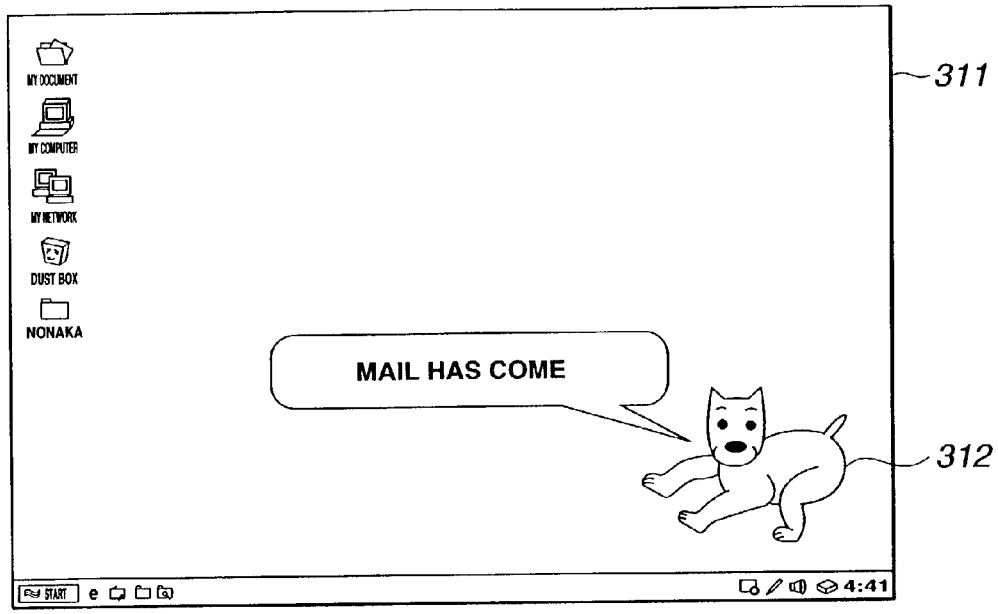

Thus, the CPU of the desk-top type personal computer 221 forms a picture image such that character speaks to display that picture image on the display 225. FIG. 22 is picture 311 displayed by this mail receiving function. On this picture 311, display is carried out in such a manner that character 312 speaks that "mail has come" as shown in FIG. 22.

(Alarm Function)

The agent terminal 2 constituted by this desk-top type personal computer 221 has an alarm function as the result of the fact that it is connected to the condition notice monitoring unit 54 through the agent access server 3.

First, user designates home page to be monitored with respect to character of the agent terminal 2. A method of designating home page is arbitrary. For example, it is sufficient to directly input URL of home page that monitoring is wished by keyboard, etc., and it is also sufficient to designate monitoring in reading home page in which monitoring is wished by browser. Thus, the desk-top type personal computer 221 constituting the agent terminal 2 transmits information (URL) of home page to be monitored, etc. and agent ID to the agent access sever 3.

The agent access server 3 transfers this information to the condition notice monitoring unit 54. The condition notice monitoring unit 54 stores this agent ID and monitoring condition.

The condition notice monitoring unit 54 monitors home page of monitoring condition every fixed period, and is operative so that the entire or a portion of home page is updated, it transmits that update information, etc. to the agent access server 3. The agent access server 3 transfers that update information to the desk-top type personal computer 221 constituting the agent terminal 2. The CPU of the desk-top type personal computer 221 forms a picture image that character speaks on the basis of this update information, etc. The CPU allows the display 225 to display that picture image.

Figure 23:
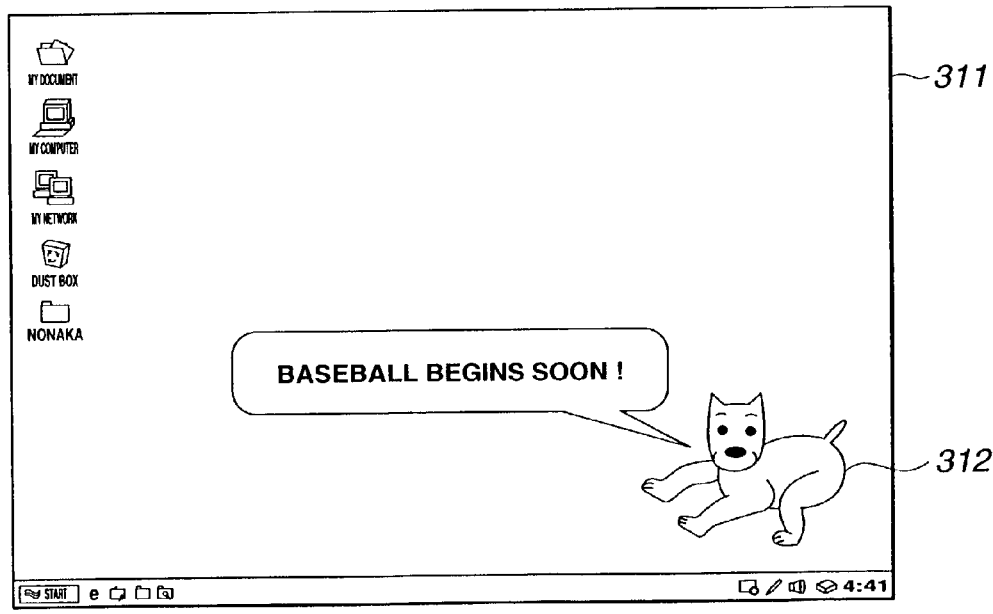
Figure 24:
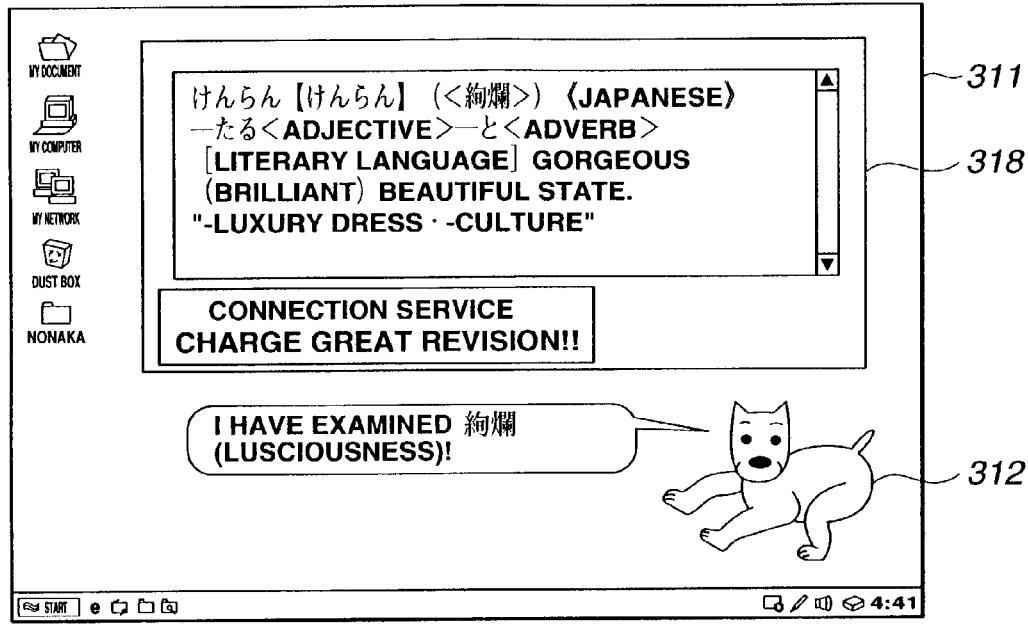

In the case where start time is changed, picture 311 such that character 312 speaks that "Baseball begins soon!" is displayed on the display 225 as shown in FIG. 23.

The alarm function can all alarm matters of monitoring condition that user designates. For example, this alarm function carries out interlocking with respect to stock price, or teaches change of start time of favourite television program.

In addition, schedule function is added to this alarm function (cooperation with ASP (Application Service Provider) to use this schedule function, thereby making it possible to intentionally set alarm.

(Dictionary Function)

The agent program of this agent terminal 2 also has dictionary function. On the internet, there is site (web server) for carrying out dictionary service. Thus, when term to be examined is inputted to the dictionary function of the agent terminal 2, the agent terminal 2 examines this term, etc. by making use of this dictionary service site. When examined result is taken into from the dictionary service, the agent terminal 2 displays picture 311 such that character 312 speaks that "I have examined 絢爛(luciousness)", and displays examined content 318 at the central portion of the picture 311.

(Security Function)

At the agent terminal 2 constituted by the desk-top type personal computer 221, there is also provided security function. This security function serves to carry out control of personal information.

The agent program of this agent terminal 2 has artificial intelligence function as described above, and personal information are stored with respect to the personal information data base 51a of the personal information storage unit 51 by conversation made between user and character by the artificial intelligence function.

Figure 25:
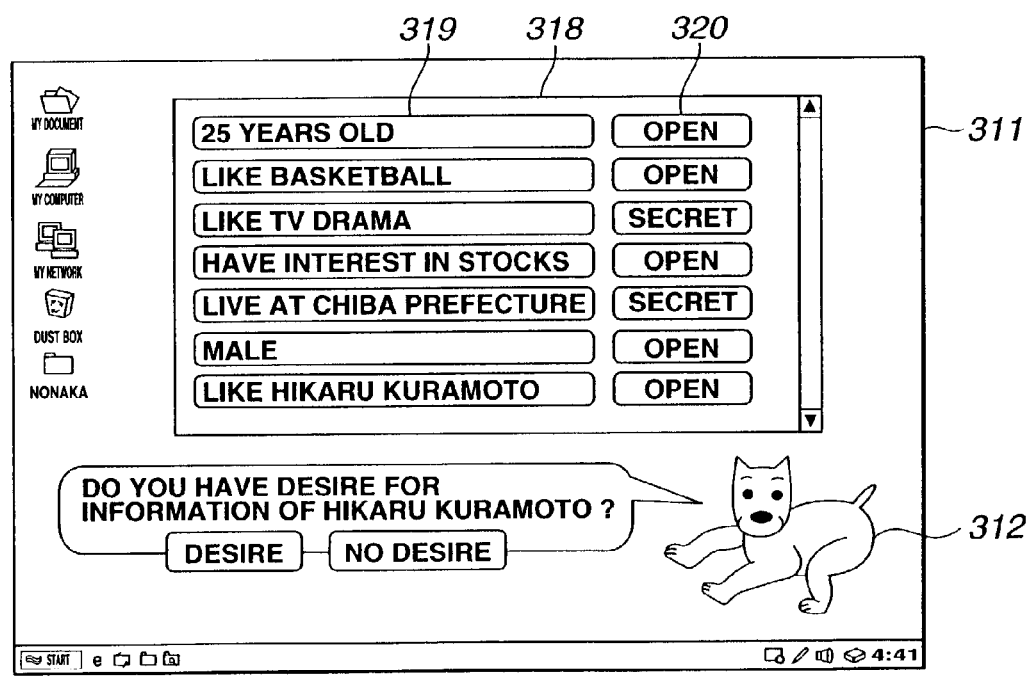

Thus, the desk-top type personal computer 221 constituting the agent terminal 2 inquires whether or not important information is opened (published) in a Table form. Namely, the desk-top type personal computer 221 forms a displayed picture image as shown in FIG. 25 to send that picture image to the display 225. On the display 225, Table 318 in a Table form as shown in FIG. 25 is displayed. The Table 318 consists of content column 319 for personal information and another column 320 for open/secret.

Within the content column 319 for personal information, there are displayed "25 years old", "like basketball", "like TV drama", "have interest in stocks", "live at Chiba Prefecture", "Male", and "like Hikaru Kuramoto (imaginary artist name)". In correspondence with them, within another column for open/secret, "open", "open", "secret", "open", "secret", "open", and "open" are inputted. Thus, the desk-top type personal computer 221 constituting the agent terminal 2 transfers those information to the agent access server 3 together with agent IDs.

The agent access server 3 transfers these information and the agent IDs to the personal information storage unit 51. The personal information storage unit 51 rewrites these information of the personal information data base 51a.

Thus, the personal information storage unit 51 opens only information permitted to be opened even if access to corresponding personal information is provided from other person.

By such security function, user can have control right of personal information.

(Advantages, etc. of the First Embodiment)

Since this information communication system is constituted and is operated as described above, there are following advantages.

(1) Advantages of User (i) Even if user himself does not make a search, he can obtain service or advertisement corresponding thereto.

(ii) User can have control right of the personal information data base 51a of the personal information storage unit 51.

(iii) It is possible to obtain point.

(iv) It is possible to joyfully acquire useful information.

(v) It is possible to control OS (Operating System) in conversational form, and it is possible to carry out operation from this.

(2) Advantages of Advertiser (i) Since it is sufficient to merely carry out advertisement only with respect to users who have interest by information based on profile, there is no useless investment and effective advertisement can be carried out.

(ii) Since response ratio of user can be obtained, it is possible to utilize this response ratio for marketing.

(iii) Since advertisement is carried out on the basis of internet of user or key word that user has notice, it is possible to prevent resistance with respect to advertisement resulting from the fact that incontinent advertisement is carried out.

(3) Advantages of the Third Party (i) It is possible to make original character to put it on the agent terminal.

(ii) By this information communication system, new service can be provided in connection with game and/or application, etc.

(4) Advantages of Manager of Information Delivery System (i) It is possible to make direct connection to user.

(ii) It is possible to appeal to character of manager.

(iii) It is possible to obtain profile having very high accuracy.

It is to be noted that while explanation has been given in the above-described embodiment in connection with the example where the agent terminal 2 is constituted by the desk-top type personal computer 221, the agent terminal 2 may be constituted by the note type personal computer 211.

APPLIED EXAMPLE

While conversation between user and character is carried out by allowing user to input question or answer by keyboard and by allowing character to display question or answer on display in the above-described example, this invention is not limited to such implementation, but may be carried out in the following manner.

Namely, the agent terminal 2 is caused to have means capable of forming character of a predetermine shape to display it, means for taking voice of user thereinto to recognize this voice by voice (speech) recognition means to make an answer corresponding to the voice recognition result by voice so that conversation between character and user can be made, means for transmitting personal information, etc. of user obtained through conversation to agent access server, and means for allowing character to speak information from the agent access server by voice.

In addition, user may use, e.g., fixed terminal 22 of FIG. 3B to input, by voice, question or answer from microphone 228 to desk-top type personal computer 221 to output answer or question of character from speakers 226, 226 so that conversation by ordinary voice can be made.

SECOND EMBODIMENT

Figure 26:
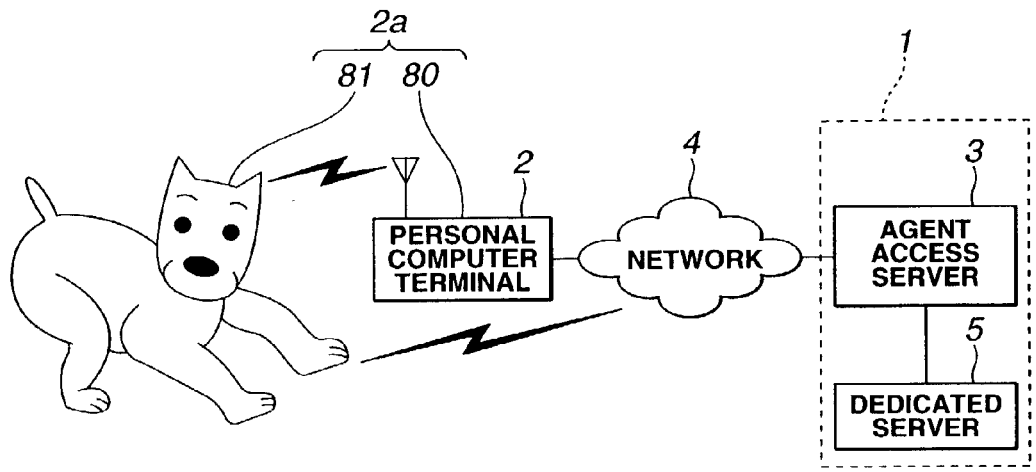
FIG. 26 is a block diagram showing another example of the information communication system according to this invention.

FIG. 26 is a block diagram showing another example of the information communication system according to this example.

In the second embodiment of this invention, as shown in FIG. 26, an agent terminal 2a is composed of a personal computer terminal 80, and a pet type robot 81 connected to this personal computer 80 by wireless.

This personal computer terminal 80 has communication function, and can be connected to agent access server 3 through communication network 4. As the agent access server 3 and the dedicated server 5, the same servers as those of the first embodiment are used. Further, also in this second embodiment, as the operation of the agent access server 3 and the operation of dedicated server 5 (personal information storage unit 51, recommend unit 52, advertisement storage unit 53, condition notice monitoring unit 54, interchange promoting unit 55, or conversation unit 56), the same operations as those of the first embodiment are used.

Further, this personal computer terminal 80 has voice (speech) recognition program, and can carry out conversion from voice data into text character. The personal computer terminal 80 has wireless communication function, and is connected to the pet type robot 81 by wireless.

The pet type robot 81 is adapted so that Central Processing Unit which realizes artificial intelligence is included therewithin, and is adapted to have ability to control expression of face, etc. and operation of the pet type robot 81. Further, the pet type robot 81 includes a speaker therewithin, and the artificial intelligence forms a predetermined voice in accordance with expression of face or operation of the pet type robot 81 to have ability to output voice from the speaker.

Further, this pet type robot 81 has wireless communication function, and is connected to the personal computer terminal 80 by wireless. The pet type robot 81 is adapted to input voice data picked up by microphone that the robot 81 itself has to the central Processing Unit through analog/digital converter, and to have ability to input this voice data to the personal computer terminal 80 through wireless communication function; and to input voice data from the personal computer terminal 80 to carry out digital/analog conversation of its input voice data to have ability to carry out voice output from the speaker. It is to be noted that voice (speech) recognition program and voice (speech) analysis program may be mounted at the pet type robot 81 side to carry out transmission/reception of voice data caused to be in text form or in code form to and from the personal computer terminal 80.

In this second embodiment, when, e.g., data to the effect that mail has been arrived from the interchange promoting unit 55 is sent to the personal computer terminal 80 of the agent terminal 2a through the agent access server 3, the personal computer terminal 80 forms voice data of "mail has come" to send out it to the pet type robot 81 by the wireless communication function.

Then, at the inside of the pet type robot 81, this voice data is caused to undergo digital/analog conversion to speak "mail has come" from the speaker. Thus, it looks like as if the pet type robot 81 speaks.

When user speaks that "Read mail" toward the pet type robot 81, that voice is caused to undergo analog/digital conversion at the inside of the pet type robot 81 to send it to the personal computer terminal 80 by wireless communication function. The personal computer terminal 80 converts voice into text by speech (voice) recognition program thereafter to analyze instruction content. In this case, since mail read operation is instructed, mail reading software is used to convert mail into voice data to transmit it to the pet type robot 81 through wireless communication function.

At the inside of the pet type robot 81, this voice data is caused to undergo digital/analog conversion to speak it from the speaker. When, e.g., mail has the content that "I am waiting in ○ square at Shinjuku Station on the 10th of October. From Ehchan", it looks that the pet type robot 81 speaks voice of "I am waiting in ○ square at Shinjyuku Station on the 10th October. From Ehchan".

It is to be noted that, in this second embodiment, growing operation of character as in the first embodiment is not used.

In accordance with such second embodiment, there are the following advantages.

(1) Advantages of User (i) Even if user himself does not make a search, it is possible to receive service or advertisement corresponding to user.

(ii) User can have control right of the personal information data base 51a of the personal information storage unit 51.

(iii) It is possible to obtain point.

(iv) It is possible to joyfully acquire useful information.

(2) Advantages of Advertiser (i) Since it is sufficient to merely carry out advertisement only with respect to users who have interest by information based on profile, there is no useless investment and effective advertisement can be carried out.

(ii) Since response ratio of user can be obtained, it is possible to utilize this response ratio for marketing.

(iii) Since advertisement is carried out on the basis of interest of user or key word that user has notice, it is possible to prevent resistance with respect to advertisement resulting from the fact that incontinent advertisement is carried out.

(3) Advantages of the Third Party (i) It is possible to make original character to put it on the agent terminal.

(ii) By this information communication system, new service can be provided in connection with game and/or application, etc.

(4) Advantages of Manager of Information Delivery System (i) It is possible to make direct connection to user.

(ii) It is possible to appeal to character of manager.

(iii) It is possible to obtain profile having very high accuracy.

(iv) Manager of information delivery system can acquire important and correct personal information.

(v) It is possible to realize cooperation with real character (pet type robot).

(Memory Medium)

With respect to the operation contents which have been explained in the above-described first and second embodiments according to this invention, programs corresponding to respective operations are stored at the agent terminal 2, the agent access server 3 or the dedicated server 5, operations will be carried out in accordance with those programs.

Thus, programs in which at least more than ones of programs of the respective operations which have been explained are combined may be stored with respect to memory medium.

Here, as the memory medium, there are included, e.g., floppy disc, hard disc, magneto-optical disc, CD-ROM, CD-R, CD-RW, DVD, magnetic tape, ROM cartridge, RAM card with battery back-up, flash memory cartridge, and non-volatile RAM card, etc.

Such memory medium is medium in which information (mainly digital data, program) is stored by any means, and there may be employed any medium which permits computer or dedicated processor to realize a predetermined function. This similarly applies in the following.

It is to be note that while explanation has been given in the above-described embodiments with the example where personal computer is used being as the main subject, this invention is not limited to this implementation, but may be also realized by pocket telephone, PDA (personal portable information terminal), or digital TV in which set top box is included or mounted).

INDUSTRIAL APPLICABILITY

In this invention, user can receive or advertisement corresponding to user himself even if he does not make a search, can have control right of personal information data base, and can joyfully acquire useful information. For advertiser, since it is sufficient to merely carry out advertisement only with respect to users which have interest by information based on profile, there is no useless investment and effective advertisement can be carried out. Since response ratio of user can be obtained, it is possible to utilize this response ratio for marketing. Since advertisement is carried out on the basis of interest of user or key word that user has notice, it is possible to prevent resistance with respect to advertisement resulting from the fact that incontinent advertisement is carried out. For manager of the information delivery system, direct connection to user can be made and it is possible to appeal to character of manager. In addition, information communication system capable of obtaining profile having very high accuracy can be realized.

The invention claimed is:

1. An information communication system in which agent terminals for users and an agent access server are connected through a communication network, and multiple dedicated servers for processing various special functions are connected to this agent access server, wherein the agent terminal comprises:

character formation means for forming a character of a predetermined shape and displaying the character;

character interaction means for permitting interaction between the character and a user;

transmitting means for transmitting user information obtained through interaction with the character to the agent access server;

display means for displaying information from the agent access server in a form such that the character introduces the information, and voice recognition means for identifying the user by voice, accepting user input by voice, and selecting user parameters based on the user identification and voice inputs, wherein the agent access server analyzes data sent from the agent terminal, selects one of the dedicated servers based on the results of the analysis, sends the data to that dedicated server, and returns results from the dedicated server to the agent terminal, and wherein the multiple dedicated servers store user information including the user's response ratio for one or more keywords, and use the response ratio to select information to send to the user.

2. The information communication system as set forth in claim 1, wherein the agent terminal further comprises a character conversation means for allowing the character to interact by voice with the user.

3. The information communication system as set forth in claim 1, wherein the agent terminal comprises:

character shape customization means for interaction between the user and the character to change the shape of the character by a predetermined parameter that can be stored; and character personality customization means for interaction between the user and the character to change the personality of the character by storing information.

4. The information communication system as set forth in claim 1, wherein the agent terminal comprises:

robot terminal conversation means including a terminal connected to the agent access server and a robot in the shape of a pet, wherein the robot is connected directly to the agent access server by wireless communications, and the terminal recognizes voice data from the robot and sends data back to the robot for the robot to speak; and robot server conversation means for allowing the robot to speak information sent from the agent access server.

5. The information communication system as set forth in claim 1, wherein the agent terminal comprises:

character personality customization means for interaction between the user and the character to change the personality of the character by storing information.

6. An agent terminal adapted to collect user information and send it to a server, or to collect information useful for a user from a server or internet, the agent terminal comprising:

character formation means for forming a character of a predetermined shape and displaying the character;

character interaction means for permitting interaction between the character and a user;

transmitting means for transmitting user information obtained through interaction with the character to the agent access server;

display means for displaying information from the agent access server in a form such that the character introduces the information, and voice recognition means for identifying the user by voice, accepting user input by voice, and selecting user parameters based on the user identification and voice inputs, wherein the agent access server stores user information including the user's response ratio for one or more keywords, and uses the response ratio to select information to send to the user.

7. The agent terminal as set forth in claim 6, wherein the terminal further comprises character conversation means for allowing the character to interact by voice with the user.

8. The agent terminal as set forth in claim 7, wherein the terminal further comprises:

security inquiry means for requesting the user to input an instruction indicating whether or not certain user information can be shared with a third person.

9. The agent terminal as set forth in claim 7, wherein the terminal interacts with the user to analyze the user's taste and stores information to effectively advertise to the user.

10. The agent terminal as set forth in claim 6, wherein the terminal further comprises:

character shape customization means for interaction between the user and the character to change the shape of the character by a predetermined parameter that can be stored; and character personality customization means for interaction between the user and the character to change the personality of the character by storing information.

11. The agent terminal as set forth in claim 6, wherein the terminal further comprises:

robot terminal conversation means including a terminal connected to an agent access server and a robot in the shape of a pet, wherein the robot and the terminal are connected by wireless communications, and the terminal recognizes voice data from the robot and sends data back to the robot for the robot to speak; and robot server conversation means for allowing the robot to speak information sent from the agent access server.

12. The agent terminal as set forth in claim 6, wherein the terminal further comprises:

character personality customization means for interaction between the user and the character to change the personality of the character by storing information.

13. A memory medium storing an agent program for collecting user information and sending this information to an agent access server, or for collecting information useful to the user from a server or the internet, wherein the agent program allows a computer to execute:

a character formation function for forming a character of a predetermined shape and displaying the character;

a character interaction function for permitting interaction between the character and a user;

a transmitting function for transmitting user information obtained through interaction with the character to the agent access server;

a display function for displaying information from the server in a form such that the character introduces the information; and a voice recognition function for identifying the user by voice, accepting user input by voice, and selecting user parameters based on the user identification and voice inputs;

wherein the agent program stores the user's response ratio for one or more keywords, and uses the response ratio to select information to send to the user.

14. The memory medium as set forth in claim 13, wherein the agent program allows the computer to further execute a character conversation function to allow the character to interact by voice with the user.

15. The memory medium as set forth in claim 13, wherein the agent program allows the computer to execute:

a character shape customization function for interaction between the user and the character to change the shape of the character by a predetermined parameter that can be stored; and a character personality customization function for interaction between the user and the character to change the personality of the character by storing information.

16. An agent program for collecting user information and sending this information to an agent access server, or for collecting information useful to the user from a server or the internet, wherein the agent program allows a computer to execute:

a character formation function for forming a character of a predetermined shape and displaying the character;

a character interaction function for permitting interaction between the character and a user;

a transmitting function for transmitting user information obtained through interaction with the character to the agent access server;

a display function for displaying information from the server in a form such that the character introduces the information; and a voice recognition function for identifying the user by voice, accepting user input by voice, and selecting user parameters based on the user identification and voice inputs;

wherein the agent program stores the user's response ratio for one or more keywords, and uses the response ratio to select information to send to the user.

17. The agent program as set forth in claim 16, wherein the program allows the computer to further execute a character conversation function to allow the character to interact by voice with the user.

18. The agent program as set forth in claim 16, wherein the program allows the computer to execute:

a character shape customization function for interaction between the user and the character to change the shape of the character by a predetermined parameter that can be stored; and a character personality customization function for interaction between the user and the character to change the personality of the character by storing information.

* * * * *